United States Patent
Rambo

(10) Patent No.: US 11,898,492 B2
(45) Date of Patent: Feb. 13, 2024

(54) FLUID EXCHANGE APPARATUSES AND METHODS OF EXCHANGING FLUIDS BETWEEN STREAMS

(71) Applicant: General Electric Company, Schenectady, NY (US)

(72) Inventor: Jeffrey Douglas Rambo, Mason, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/896,283

(22) Filed: Aug. 26, 2022

(65) Prior Publication Data

US 2022/0412262 A1 Dec. 29, 2022

Related U.S. Application Data

(63) Continuation of application No. 16/386,745, filed on Apr. 17, 2019, now Pat. No. 11,448,131.

(51) Int. Cl.
*F02C 7/18* (2006.01)

(52) U.S. Cl.
CPC .......... *F02C 7/18* (2013.01); *F05D 2260/201* (2013.01)

(58) Field of Classification Search
CPC ........ F02C 7/18; F02C 7/00; F05D 2260/201; F05D 2260/221; F02K 3/075; F02K 3/115; F02K 3/077
See application file for complete search history.

(56) References Cited

U.S. PATENT DOCUMENTS

| 3,792,584 A | 2/1974 | Klees |
| 4,054,030 A | 10/1977 | Pedersen |

(Continued)

FOREIGN PATENT DOCUMENTS

| CA | 2062887 A1 | 10/1992 |
| EP | 3196454 A1 | 7/2017 |

(Continued)

OTHER PUBLICATIONS

Ganev et al., Power and Thermal Management for Future Aircraft, 13ATC-0280, SAE 2013 AeroTech Congress & Exhibition, International, 2013, pp. 1-15.

*Primary Examiner* — Woody A Lee, Jr.
*Assistant Examiner* — Eric A Lange
(74) *Attorney, Agent, or Firm* — Dority & Manning, P.A.

(57) ABSTRACT

Provided are fluid exchange apparatuses and methods of exchanging fluids between streams. Exemplary fluid exchange apparatus includes a first interleaved pathway with a plurality of first passages, and a second interleaved pathway with a plurality of second passages, in which the plurality of first passages and the plurality of second passages interleave with one another. Exemplary methods include directing a first fluid through a first interleaved pathway of a fluid exchange apparatus and directing a second fluid through a second interleaved pathway of a fluid exchange apparatus. The first fluid may flow from an upstream portion of a first duct into the first interleaved pathway and may discharge into a downstream portion of the second duct. The second fluid may flow from an upstream portion of the second duct into the second interleaved pathway and may discharge into a downstream portion of the first duct.

20 Claims, 15 Drawing Sheets

(56) References Cited

U.S. PATENT DOCUMENTS

| | | | |
|---|---|---|---|
| 4,060,981 A | 12/1977 | Hampton | |
| 4,085,583 A * | 4/1978 | Klees | F02K 3/075 60/761 |
| 4,214,610 A * | 7/1980 | James | F02K 3/075 60/226.3 |
| 5,054,288 A | 10/1991 | Salemann | |
| 5,142,868 A | 9/1992 | Woon et al. | |
| 7,614,210 B2 | 11/2009 | Powell et al. | |
| 8,387,362 B2 | 3/2013 | Storage et al. | |
| 8,438,838 B2 | 5/2013 | Perveiler et al. | |
| 8,522,572 B2 | 9/2013 | Coffinberry et al. | |
| 8,756,910 B2 | 6/2014 | Donovan et al. | |
| 8,789,376 B2 | 7/2014 | Coffinberry | |
| 9,045,998 B2 | 6/2015 | Lo et al. | |
| 9,200,855 B2 | 12/2015 | Kington et al. | |
| 9,212,623 B2 | 12/2015 | Murphy et al. | |
| 9,243,563 B2 | 1/2016 | Lo | |
| 9,790,893 B2 | 10/2017 | Snyder | |
| 9,797,311 B2 | 10/2017 | Suciu et al. | |
| 9,840,967 B2 | 12/2017 | Snyder et al. | |
| 9,945,325 B2 | 4/2018 | Roberge | |
| 9,964,037 B2 | 5/2018 | Snyder et al. | |
| 11,448,131 B2 * | 9/2022 | Rambo | F02C 7/18 |
| 2009/0188234 A1 | 7/2009 | Suciu et al. | |
| 2010/0043386 A1 | 2/2010 | Perveiler et al. | |
| 2010/0180571 A1 | 7/2010 | Zysman et al. | |
| 2012/0144842 A1 | 6/2012 | Snyder | |
| 2012/0272658 A1 | 11/2012 | Murphy | |
| 2013/0092350 A1 | 4/2013 | N. et al. | |
| 2015/0129180 A1 | 5/2015 | Strehlow et al. | |
| 2016/0010589 A1 | 1/2016 | Rolt | |
| 2016/0108813 A1 | 4/2016 | Schmitz | |
| 2016/0177828 A1 | 6/2016 | Snyder et al. | |
| 2017/0204787 A1 | 7/2017 | Duesler et al. | |

FOREIGN PATENT DOCUMENTS

| | | |
|---|---|---|
| GB | 586554 A | 3/1947 |
| JP | 2007206022 A | 8/2007 |

* cited by examiner

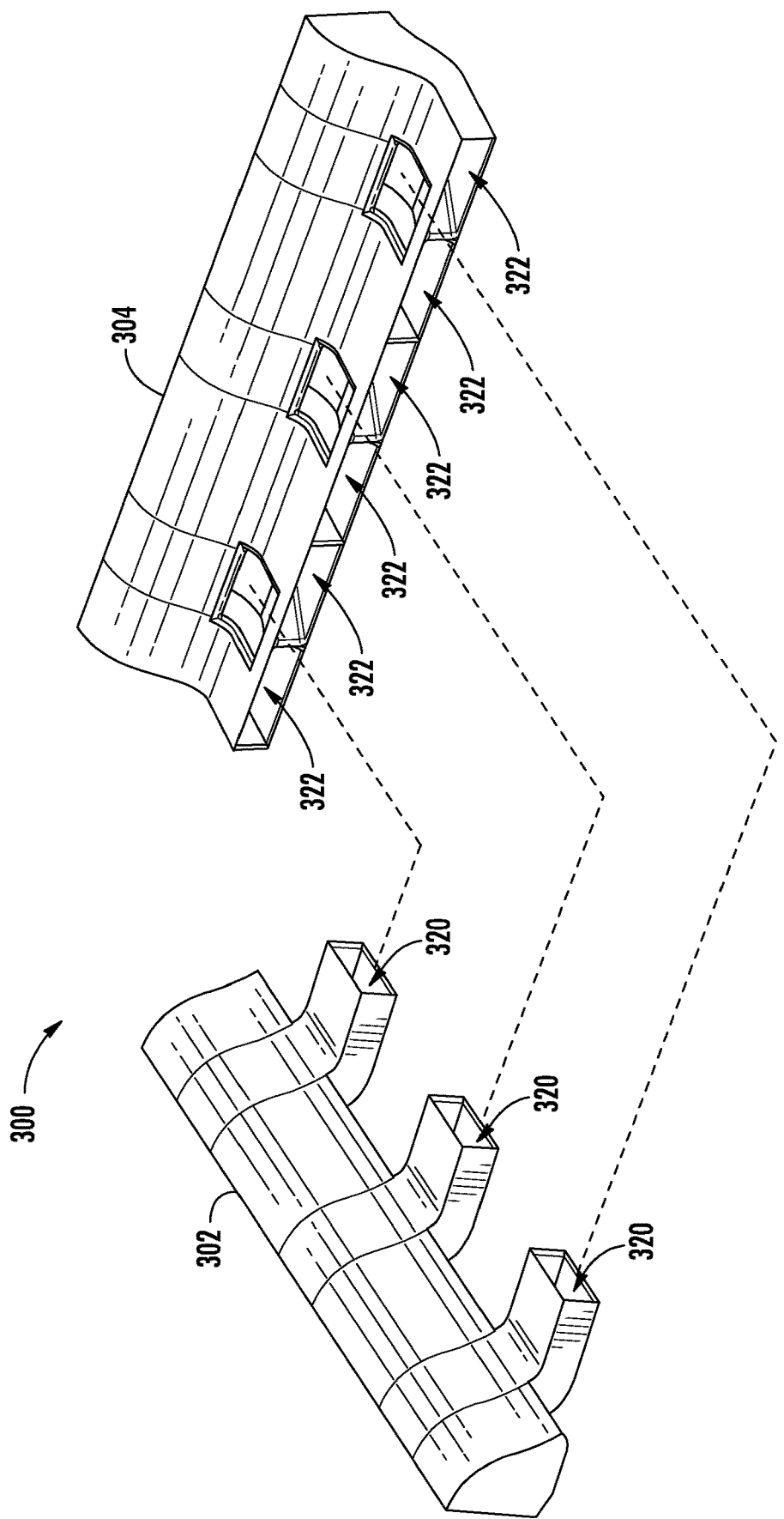

FLUID EXCHANGE APPARATUSES AND METHODS OF EXCHANGING FLUIDS BETWEEN STREAMS

CROSS-REFERENCE TO RELATED APPLICATION

This application is a continuation of U.S. patent application Ser. No. 16/386,745, filed Apr. 17, 2019, which is hereby incorporated by reference in its entirety.

FIELD

The present disclosure pertains to fluid exchange apparatuses, heat management systems that include a fluid exchange apparatus, and methods of exchanging fluids between streams using a fluid exchange apparatus, and more particularly fluid exchange apparatuses that include a plurality of interleaved pathways.

BACKGROUND

A heat management system may be utilized to manage temperatures of various components or fluid streams of a primary system. Typically, a heat management system may utilize existing fluid streams associated with the primary system. Such existing fluid streams may include input fluid streams and/or output fluid streams. For example, a heat management system for a turbomachine may utilize relatively cool pressurized fan air such as from a bypass duct to directly or indirectly cool the turbomachine or related components or fluid streams. Such a heat management system may also utilize bleed air extracted from the turbomachine as a heat source and/or as a cooling source for other fluid streams or components.

A heat management system that utilizes existing fluid streams associated with a primary system may exhibit greater energy efficiency relative to the use of an external energy source for heating or cooling. However, the use of input streams and/or output streams of a primary system for heat management may detract from the output or performance of the primary system. This may be the case even though the heat management system may be desirable for operation and performance of the primary system. For example, the use of pressurized fan air such as from a bypass duct for cooling may detract from the thrust generated by the turbomachine even though the resulting cooling may be necessary for operation or performance of the turbomachine.

Accordingly, there exists a need for improved heat management systems that better utilize fluid streams associated with a primary system.

BRIEF DESCRIPTION

Aspects and advantages will be set forth in part in the following description, or may be obvious from the description, or may be learned through practicing the presently disclosed subject matter.

In one aspect, the present disclosure embraces fluid exchange apparatuses. An exemplary fluid exchange apparatus includes a first interleaved pathway with a plurality of first passages, and a second interleaved pathway with a plurality of second passages, in which the plurality of first passages and the plurality of second passages interleave with one another. The plurality of first passages may traverse the second interleaved pathway so as to maintain fluid separation of a fluid in the first interleave pathway and a fluid in the second interleaved pathway. The plurality of second passages may traverse the first interleaved pathway so as to maintain fluid separation of the fluid in the second interleaved pathway and the fluid in the first interleaved pathway. The fluid exchange apparatus may have a curvilinear shape or profile.

In some embodiments, a fluid exchange apparatus may include one or more crossover pathways providing fluid communication between the first interleaved pathway and the second interleaved pathway. Such a fluid exchange apparatus may include a flow modulator in fluid communication with at least one of the one or more crossover pathways.

Exemplary fluid exchange apparatuses may include a first heat exchanger operably coupled to the first interleaved pathway so as to provide fluid communication between the first heat exchanger and the first interleaved pathway. Additionally, or in the alternative, exemplary fluid exchange apparatuses may include a second heat exchanger operably coupled to the second interleaved pathway so as to provide fluid communication between the second heat exchanger and the second interleaved pathway.

In another aspect, the present disclosure embraces heat management systems for a turbomachine. An exemplary heat management system includes a first duct having a first upstream portion and a first downstream portion, a second duct having a second upstream portion and a second downstream portion, and a fluid exchange apparatus that has a first interleaved pathway and a second interleaved pathway. The first interleaved pathway may be in fluid communication with the first upstream portion of the first duct and the second downstream portion of the second duct. The second interleaved pathway may be in fluid communication with the second upstream portion of the second duct and the first downstream portion of the first duct. In some embodiments, at least a portion of the fluid exchange apparatus may be disposed within the first duct, and/or at least a portion of the fluid exchange apparatus may be disposed within the second duct. The first interleaved pathway may have a decreasing cross-sectional surface area from an upstream side to a downstream side thereof. The second interleaved pathway may have an increasing cross-sectional surface area from an upstream side to a downstream side thereof.

In some embodiments, the first duct may include an annular outer bypass duct of the turbomachine and/or the second duct may include an annular inner bypass duct of the turbomachine. Alternatively, the first duct may include an annular inner bypass duct of the turbomachine and/or the second duct may include an annular outer bypass duct of the turbomachine.

A plurality of fluid exchange apparatus segments may be disposed circumferentially about an annular outer duct and/or an annular inner duct, with each of the fluid exchange apparatus segments having a first interleaved pathway segment and a second interleaved pathway segment. The first interleaved pathway segments may be in fluid communication with the first upstream portion of the first duct and the second downstream portion of the second duct. The second interleaved pathway segments may be in fluid communication with the second upstream portion of the second duct and the first downstream portion of the first duct.

In exemplary embodiments, a heat management system may include a first heat exchanger disposed upstream of the first interleaved pathway, and/or a second heat exchanger disposed downstream of the second interleaved pathway. The first heat exchanger may include a first inlet in fluid communication with the first upstream portion of the first duct and a first outlet in fluid communication with the first interleaved pathway. The second heat exchanger may include a second inlet in fluid communication with the second interleaved pathway and a second outlet in fluid communication with the first downstream portion of the first duct. The first heat exchanger and/or the second heat exchanger may be disposed within the first duct. In some embodiments, a bottom surface of the first heat exchanger and/or a bottom surface of the second heat exchanger may define an inner surface of the second duct.

In another aspect, the present disclosure embraces methods of exchanging fluids between streams. An exemplary method includes directing a first fluid through a first interleaved pathway of a fluid exchange apparatus and directing a second fluid through a second interleaved pathway of a fluid exchange apparatus. The first fluid may flow from an upstream portion of a first duct into the first interleaved pathway and may discharge into a downstream portion of the second duct. The second fluid may flow from an upstream portion of the second duct into the second interleaved pathway and may discharge into a downstream portion of the first duct.

An exemplary method may further include directing the first fluid across or through a first heat exchanger disposed upstream of the first interleaved pathway, and/or directing the second fluid across or through a second heat exchanger disposed downstream of the second interleaved pathway. The first heat exchanger may include a first inlet in fluid communication with the first upstream portion of the first duct and a first outlet in fluid communication with the first interleaved pathway. The second heat exchanger may include a second inlet in fluid communication with the second interleaved pathway and a second outlet in fluid communication with the first downstream portion of the first duct.

In some embodiments, an exemplary method may include accelerating the first fluid discharging into the downstream portion of the second duct at least in part by an eductor fluid flowing past a decreasing cross-sectional area within the second duct provided at least in part by the first interleaved pathway and/or the second interleaved pathway extending into the second duct. In some embodiments, a first pressure in the upstream portion of the first duct may be lower than a second pressure in the downstream portion of the second duct, and the first fluid may nevertheless be discharged into the downstream portion of the second duct.

In some embodiments, the first duct may include an annular outer bypass duct of a turbomachine and/or the second duct may include an annular inner bypass duct of a turbomachine. An exemplary method may include cooling a stream of compressor bleed air flowing across or through the first heat exchanger using a stream of outer bypass air from the annular outer bypass duct, providing a heated stream of outer bypass air, and directing the heated stream of outer bypass air into the annular inner bypass duct using the first interleaved pathway of the fluid exchange apparatus. An exemplary method may additionally or alternatively include cooling a stream of turbine cooling air flowing across or through the second heat exchanger using a stream of inner bypass air from the annular inner bypass duct, providing a heated stream of inner bypass air, and directing the heated stream of inner bypass air into the annular outer bypass duct, with the stream of inner bypass air directed to the second heat exchanger using the second interleaved pathway of the fluid exchange apparatus.

These and other features, aspects and advantages will become better understood with reference to the following description and appended claims. The accompanying drawings, which are incorporated in and constitute a part of this specification, illustrate exemplary embodiments and, together with the description, serve to explain certain principles of the presently disclosed subject matter.

BRIEF DESCRIPTION OF THE DRAWINGS

A full and enabling disclosure, including the best mode thereof, directed to one of ordinary skill in the art, is set forth in the specification, which makes reference to the appended Figures, in which:

FIGS. 4A-4C schematically show perspective views of an exemplary fluid exchange apparatus;

Figure 1A:
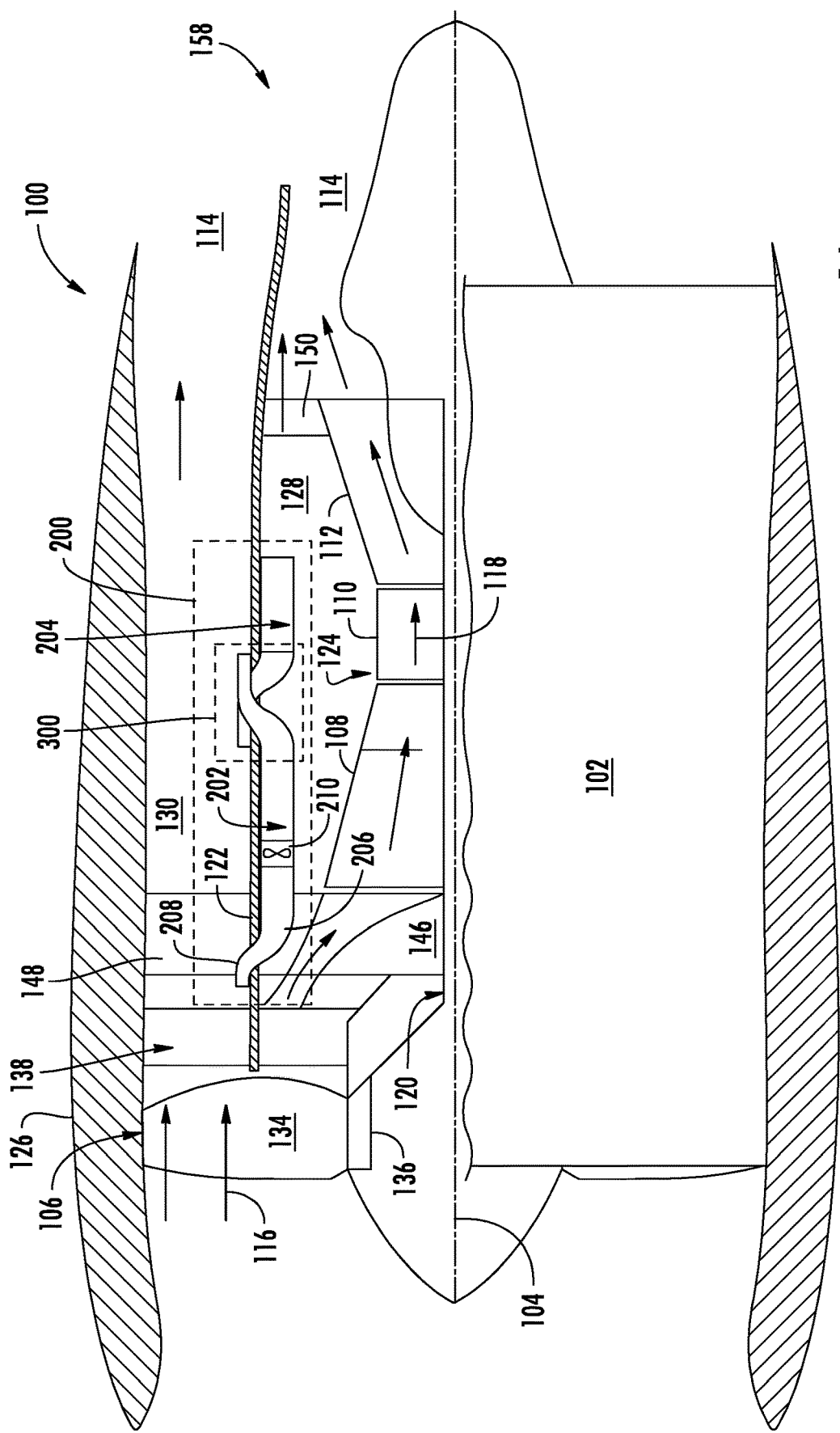
FIG. 1A schematically shows a perspective cut-away view of an exemplary turbomachine with a fluid exchange apparatus.

Repeat use of reference characters in the present specification and drawings is intended to represent the same or analogous features or elements of the present disclosure.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

The present disclosure generally pertains to fluid exchange apparatuses, heat management systems that include a fluid exchange apparatus, and methods of exchanging fluids between streams using a fluid exchange apparatus, and more particularly fluid exchange apparatuses that include a plurality of interleaved pathways. The plurality of interleaved pathways includes at least two separate pathways that each respectively include a plurality of interdigitated, interwoven, or intertwined passages that adjacently traverse one another while maintaining fluid separation as between the respective separate pathways.

The presently disclosed fluid exchange apparatuses and related systems and methods allow for the exchange of fluids between fluid streams. For example, fluid flow and/or heat may be economized between fluid streams by exchanging at least a portion of a fluid in a first stream with at least a portion of a fluid in a second stream. Additionally, the presently disclosed apparatuses and related systems and methods may be utilized to vary flow ratios between fluid streams. Exemplary fluid exchange apparatuses allow fluid streams to be exchanged at overlapping axial locations. At least a portion of a fluid exchange apparatus may be positioned within a flow path of one or more fluid streams, and in some embodiments an outer surface of the fluid exchange apparatus may define an inner surface of a fluid stream such that a portion of a pathway wall such as a duct wall may be eliminated so as to save weight and/or space.

The presently disclosed fluid exchange apparatuses and related systems and methods may be implemented in connection with any primary system. In an exemplary embodiment, a fluid exchange apparatus, related system, and/or method may be implemented in connection with a turbomachine, such as a turbomachine that includes annular inner and outer bypass ducts. A fluid exchange apparatus may be configured to exchange fluids between the annular inner and outer bypass ducts, thereby enhancing allocation of heat management services between the respective fluid streams of the bypass ducts. For example, the optimal heat energy and/or fluid flow through the respective bypass ducts may vary depending upon operating conditions of the turbomachine.

The presently disclosed fluid exchange apparatuses and related systems and methods allow for decoupling the thermal performance of heat exchangers arranged in serial flow communication within a duct. Rather than having the performance of a downstream heat exchanger dependent on the temperature of a heated fluid stream from an upstream heat exchanger, a fluid exchange apparatus may exchange the heated fluid stream with cooler fluid from another stream. A first heat exchanger may be located upstream from a second heat exchanger, with both heat exchangers located in the same duct. The present disclosure allows for the second heat exchanger to receive relatively cool air from another duct, and at least a portion of the heated air discharging from the first heat exchanger may be exchanged with air from the other duct, thereby allowing the second heat exchanger to receive relatively cooler air from the other rather than heated air discharging from the first heat exchanger.

For example, a compressor bleed air heat exchanger may be located upstream from a cooled cooling air heat exchanger, with both heat exchangers located in an annular inner duct (which may be a thermal management system duct). The present disclosure allows for the compressor bleed air heat exchanger to receive relatively cool air from the annular inner duct, and at least a portion of the heated air discharging from the compressor bleed air heat exchanger may be exchanged with air in the annular outer duct (which may be a fan duct or a bypass duct), thereby allowing the cooled cooling air heat exchanger to receive relatively cooler air from the annular outer duct rather than heated air discharging from the compressor bleed air heat exchanger.

As another example, a compressor bleed air heat exchanger may be located upstream from a cooled cooling air heat exchanger, with both heat exchangers located in an outer cowling or nacelle surrounding the turbomachine. The present disclosure allows for the compressor bleed air heat exchanger to receive relatively cool air from an annular outer duct (which may be a bypass duct or thermal management system duct), and at least a portion of the heated air discharging from the compressor bleed air heat exchanger may be exchanged with air in the annular outer duct, thereby allowing the cooled cooling air heat exchanger to receive relatively cooler air from the annular outer duct rather than heated air discharging from the compressor bleed air heat exchanger.

As yet another example, a compressor bleed air heat exchanger may be located upstream from a cooled cooling air heat exchanger, with both heat exchangers located in annular inner duct (which may be a fan duct or a bypass duct). The present disclosure allows for the compressor bleed air heat exchanger to receive relatively cool air from an annular inner duct (which may be a bypass duct or thermal management system duct), and at least a portion of the heated air discharging from the compressor bleed air heat exchanger may be exchanged with air in the annular outer duct, thereby allowing the cooled cooling air heat exchanger to receive relatively cooler air from the annular outer duct rather than heated air discharging from the compressor bleed air heat exchanger.

As yet another example, a compressor bleed air heat exchanger may be located upstream from a cooled cooling air heat exchanger, with both heat exchangers located in an annular outer duct (which may be a bypass duct or thermal management system duct). The present disclosure allows for the compressor bleed air heat exchanger to receive relatively cool air from the annular outer duct, and at least a portion of the heated air discharging from the compressor bleed air heat exchanger may be exchanged with air in the annular inner duct, thereby allowing the cooled cooling air heat exchanger to receive relatively cooler air from the annular inner duct rather than heated air discharging from the compressor bleed air heat exchanger.

The fluid exchange apparatus may be used to vary the allocation of heat energy and/or fluid flow between respective ducts, such as in conjunction with operation of a turbomachine. In some embodiments, a fluid exchange apparatus may be used to transfer heat energy and/or fluid flow from an annular outer duct to an annular inner duct, which may improve thrust of the turbomachine. The configuration of the fluid exchange apparatus may include a decreasing cross-sectional area configured to generate an increasing fluid pressure in respect of one or more fluid streams, which may allow a fluid stream to be exchanged from a lower pressure stream to a higher-pressure stream.

It is understood that terms "upstream" and "downstream" refer to the relative direction with respect to fluid flow in a fluid pathway. For example, "upstream" refers to the direction from which the fluid flows, and "downstream" refers to the direction to which the fluid flows. It is also understood that terms such as "top", "bottom", "outward", "inward", and the like are words of convenience and are not to be construed as limiting terms. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Here and throughout the specification and claims, range limitations are combined and interchanged, and such ranges are identified and include all the sub-ranges contained therein unless context or language indicates otherwise. For example, all ranges disclosed herein are inclusive of the endpoints, and the endpoints are independently combinable with each other.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems.

Exemplary embodiments of the present disclosure will now be described in further detail. FIGS. 1A-1H schematically show exemplary embodiments of a primary system 100. FIGS. 1A, 1C, 1E, and 1G shows exemplary embodiment of a primary system 100 (e.g., a turbomachine 102) that includes a heat management system 200 with a fluid exchange apparatus 300, and FIGS. 1B, 1D, 1F, and 1H respectively show a cross-sectional view of the heat management system 200 and fluid exchange apparatus 300 within the primary system 100 (e.g., the turbomachine 102) depicted in FIGS. 1A, 1C, 1E, and 1G.

It will be appreciated that the primary systems 100 shown in FIGS. 1A-1H are provided by way of example only and not to be limiting. Numerous other primary systems 100 are contemplated, including without limitation other turbomachine 102 configurations, all of which are within the scope of the present disclosure. The turbomachine 102 may be configured for powering an aircraft (not shown) in flight. The turbomachine 102 is axisymmetrical about a longitudinal or axial centerline axis 104 and may be suitably mounted to the wing or fuselage of the aircraft as desired.

It is contemplated that a heat management system 200 may include a fluid exchange apparatus 300 located at a variety of different positions within a primary system 100 such as a turbomachine 102, some of which are depicted by way of example in FIGS. 1A-1H. Additionally, it is contemplated that a heat management system 200 may include a plurality of heat exchangers 202, 204 and corresponding fluid exchange apparatuses 300 disposed radially around one or more of the respective ducts 128, 130 and/or casings 122, 126, 132 of a turbomachine 102. Further in addition, or in the alternative, some embodiments may include a first fluid exchange apparatus 300 and a second fluid exchange apparatus 300 located downstream (not shown) from the first fluid exchange apparatus 300. A plurality of second fluid exchange apparatuses 300 may be disposed radially around one or more of the respective ducts 128, 130 and/or casings 122, 132 of a primary system 100 such as a turbomachine 102. For example, some embodiments may include a third heat exchanger (not shown) located from the second heat exchanger 204, and a second fluid exchange apparatus (not shown) located between the second heat exchanger 204 and the third heat exchanger. A plurality of third heat exchangers and second fluid exchange apparatuses 300 may be disposed radially around one or more of the respective ducts 128, 130 and/or casings 122, 132 of a primary system 100 such as a turbomachine 102.

A fluid exchange array may include one or more fluid exchange apparatuses 300 disposed radially around one or more of the respective ducts 128, 130 and/or casings 122, 132 of a primary system 100 such as a turbomachine 102. A fluid exchange array may additionally include one or more first heat exchangers 202 disposed upstream of the one or more fluid exchange apparatuses 300, and/or one or more second heat exchangers 204 disposed downstream of the one or more fluid exchange apparatuses 300. It will be appreciated that a heat management system 200 may include any number of fluid exchange arrays, such as a plurality of fluid exchange arrays in serial flow arrangement. For example, a heat management system 200 may include, in serial flow relationship, one or more first heat exchangers 202, one or more first fluid exchange apparatuses 300 downstream from the one or more first heat exchangers 202, one or more second heat exchangers 204 downstream from the one or more fluid exchange apparatuses 300, one or more second fluid exchange apparatuses 300 downstream (not shown) from the one or more second heat exchangers 204, and one or more third heat exchangers (not shown) downstream from the one or more second fluid exchange apparatuses 300.

An exemplary heat management system 200 may include a plurality of fluid exchange apparatuses 300 disposed radially across a casing or duct wall, as well as a plurality of first heat exchangers 202 disposed radially about a first duct 128 and a plurality of second heat exchangers 204 disposed radially about the first duct 128 downstream from the plurality of first heat exchangers 202. The plurality of first heat exchangers 202 may be respectively configured and arranged to receive a respective portion of the fluid from the first duct, and the plurality of second heat exchangers 204 may be respectively configured and arranged to receive a respective portion of the fluid from the second duct via the fluid exchange apparatus 300.

By way of example, as shown in FIGS. 1B, 1D, 1F, and 1H, an exemplary heat management system 200 is depicted with four (4) sets of fluid exchange apparatuses 300 and first and second interleaved pathways 302, 304. A heat management system 200 may include one or more arrays of fluid exchange apparatuses 300, which may include a first fluid exchange apparatus 300($a$), a second fluid exchange apparatus 300($b$), a third fluid exchange apparatus 300($c$), and a fourth fluid exchange apparatus 300($d$). An array of fluid exchange apparatuses 300 may additionally include a first array of first interleaved pathways 302 and a second array of second interleaved pathways 304. The first array of first interleaved pathways 302 may include a primary first interleaved pathway 302($a$), a secondary first interleaved pathway 302($b$), a tertiary first interleaved pathway 302($c$), and a quaternary first interleaved pathway 302($d$). The second array of second interleaved pathways 304 may include a primary second interleaved pathway 304($a$), a secondary second interleaved pathway 304($b$), a tertiary second interleaved pathway 304($c$), and a quaternary second interleaved pathway 304($d$). A heat management system may additionally include a first array of first heat exchangers 202 upstream from the array of fluid exchanges apparatuses 300 and a second array of second heat exchangers 204 downstream from the array of fluid exchanges apparatuses 300. However, it will be appreciated that the embodiments depicted are provided by way of example only and not to be limiting, and that any number of sets of fluid exchange apparatuses 300 and first and second interleaved pathways 302, 304 may be provided without departing from the scope of the present disclosure. In other embodiments, a single fluid exchange apparatus 300 may have an annular configuration that encompasses an annulus (e.g., 360 degrees) of a primary system 100. Likewise, first and second heat exchangers 202, 204 may have an annular configuration that encompasses an annulus (e.g., 360 degrees) of a primary system 100.

As shown in FIGS. 1A, 1C, 1E, and 1G, an exemplary turbomachine 102 includes, in serial flow relationship, a fan module 106, a compressor section 108, a combustion section 110, a turbine section 112, and an exhaust section 114. Although not depicted, the compressor section 108 may include, by way of example, a high-pressure compressor section, or a low-pressure compressor section followed by a high-pressure compressor section, and a turbine section 112 may include, by way of example, a high-pressure turbine section 112 followed by a low-pressure turbine. Ambient air 116 enters the turbomachine 102 through its intake and is pressurized in turn by the fan module 106 and compressor section 108 and mixed with fuel in the combustion section 110 for generating hot combustion gases 118. Energy is extracted from the combustion gases 118 in the turbine section 112 for powering the fan module 106 and compressor section 108, with the combustion gases 118 being discharged through the exhaust section 114. The fan module 106 is joined to the turbine section 112 by a first spool or drive shaft 120.

Figure 1B:
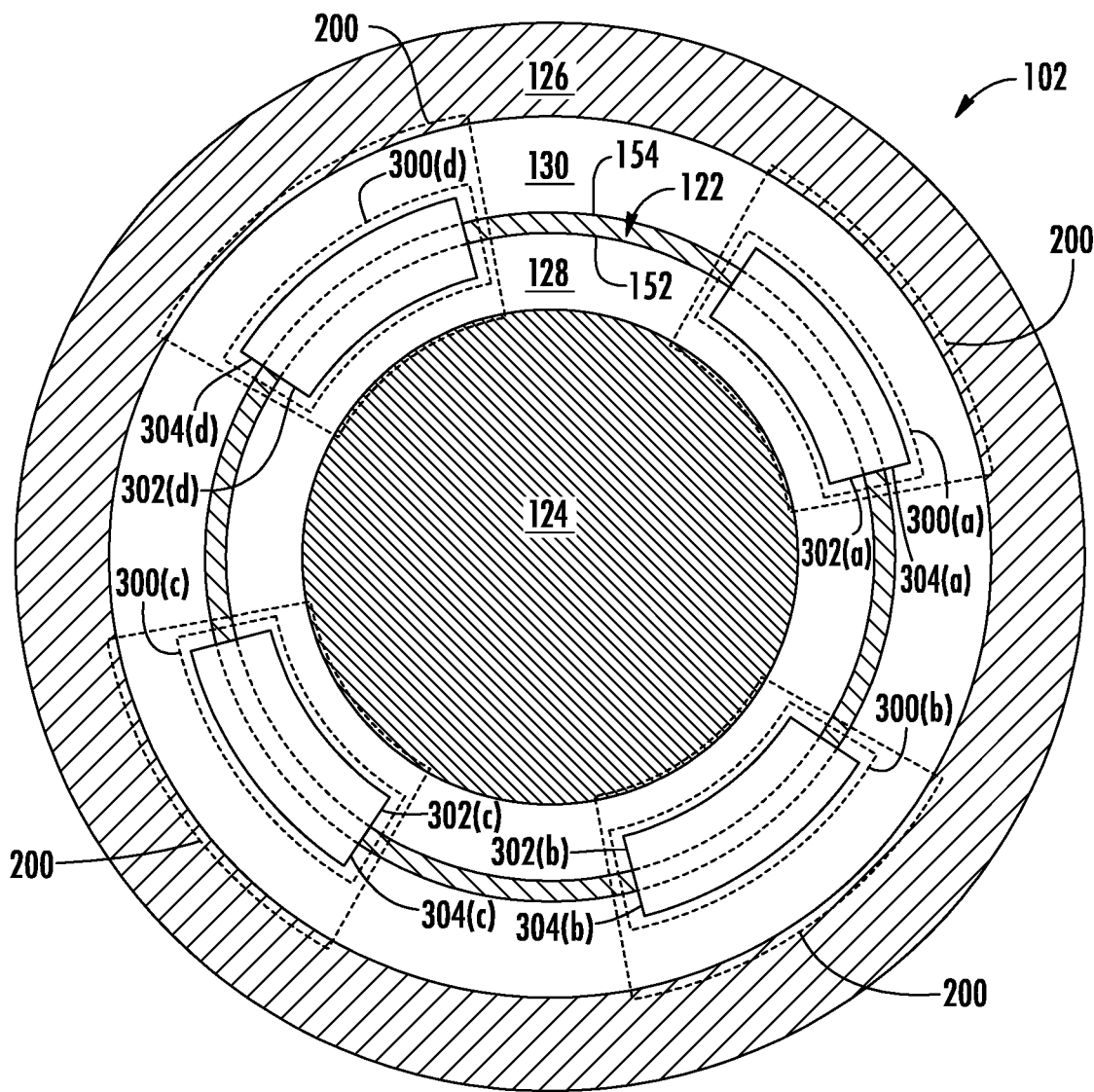
FIG. 1B schematically shows a cross-sectional view of the exemplary turbomachine of FIG. 1A.

An annular first casing 122 surrounds the core engine 124, which includes the compressor section 108, the combustion section 110, and the turbine section 112, and extends aft past the turbine section 112. An annular second casing 126 is spaced radially outwardly or outboard from the first casing 122 concentric therewith. In an exemplary embodiment, the second casing may be a nacelle. As shown in FIGS. 1A and 1B, the core engine 124 and the first casing 122 define radially therebetween an annular inner or first duct 128 which coaxially surrounds the core engine 124. In some embodiments, the annular inner or first duct 128 may be a thermal management duct (FIGS. 1A and 1B). The first duct 128 extends axially in length from its forward inlet end behind the fan module 106, around and bypassing the core engine 124. The first casing 122 and the second casing 126 define radially therebetween an annular outer or second duct 130 which coaxially surrounds the fan module 106 and the first duct 128, and which is in flow communication with the radially outer tip of the fan module 106. The outer bypass duct 130 extends axially in length from its inlet end directly behind the fan module 106 to its outlet end disposed axially aft of the core engine 124 at the aft end of the first duct 128.

Figure 1C:
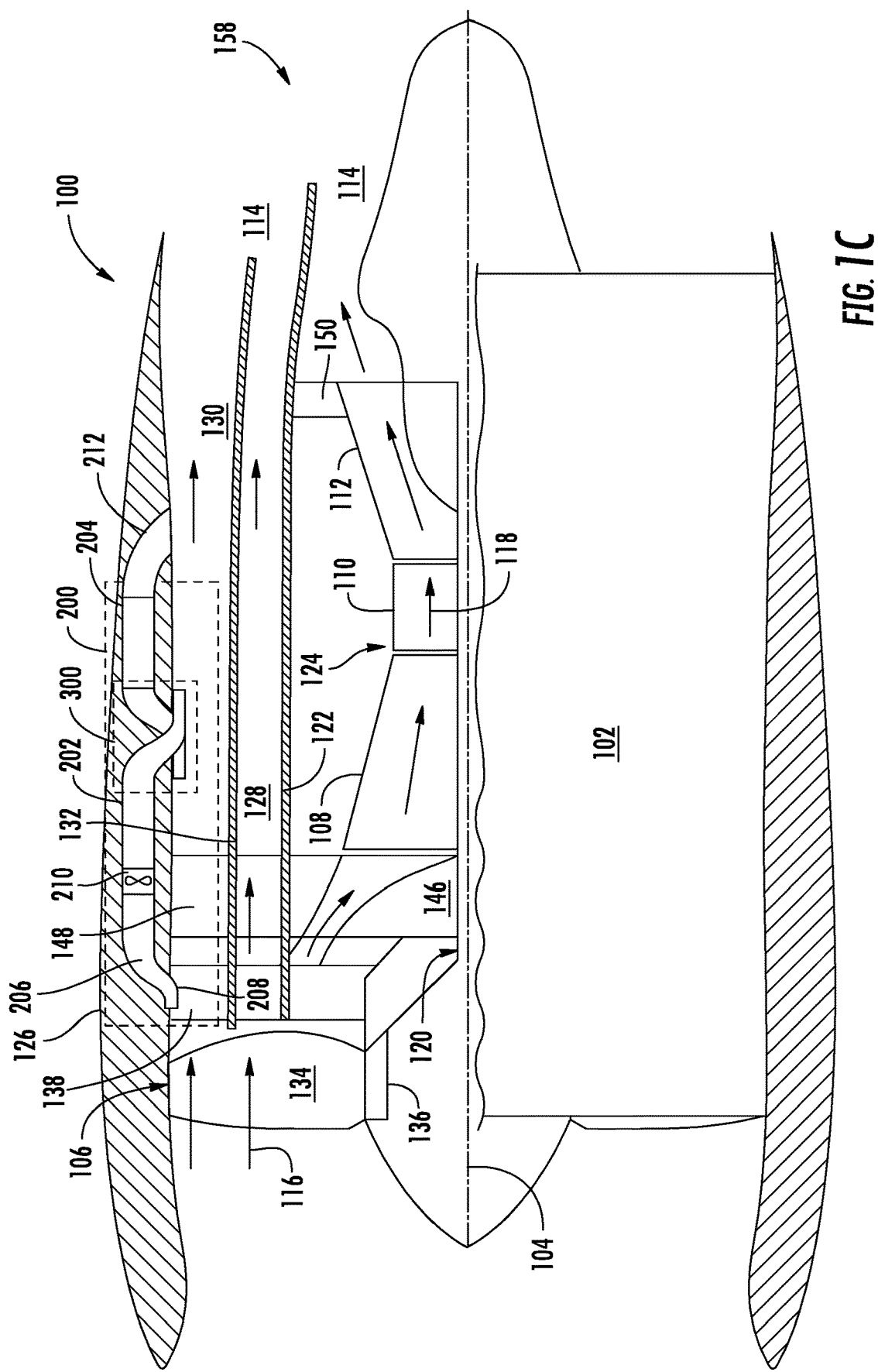
FIG. 1C schematically shows a perspective cut-away view of another exemplary turbomachine with a fluid exchange apparatus.
Figure 1D:
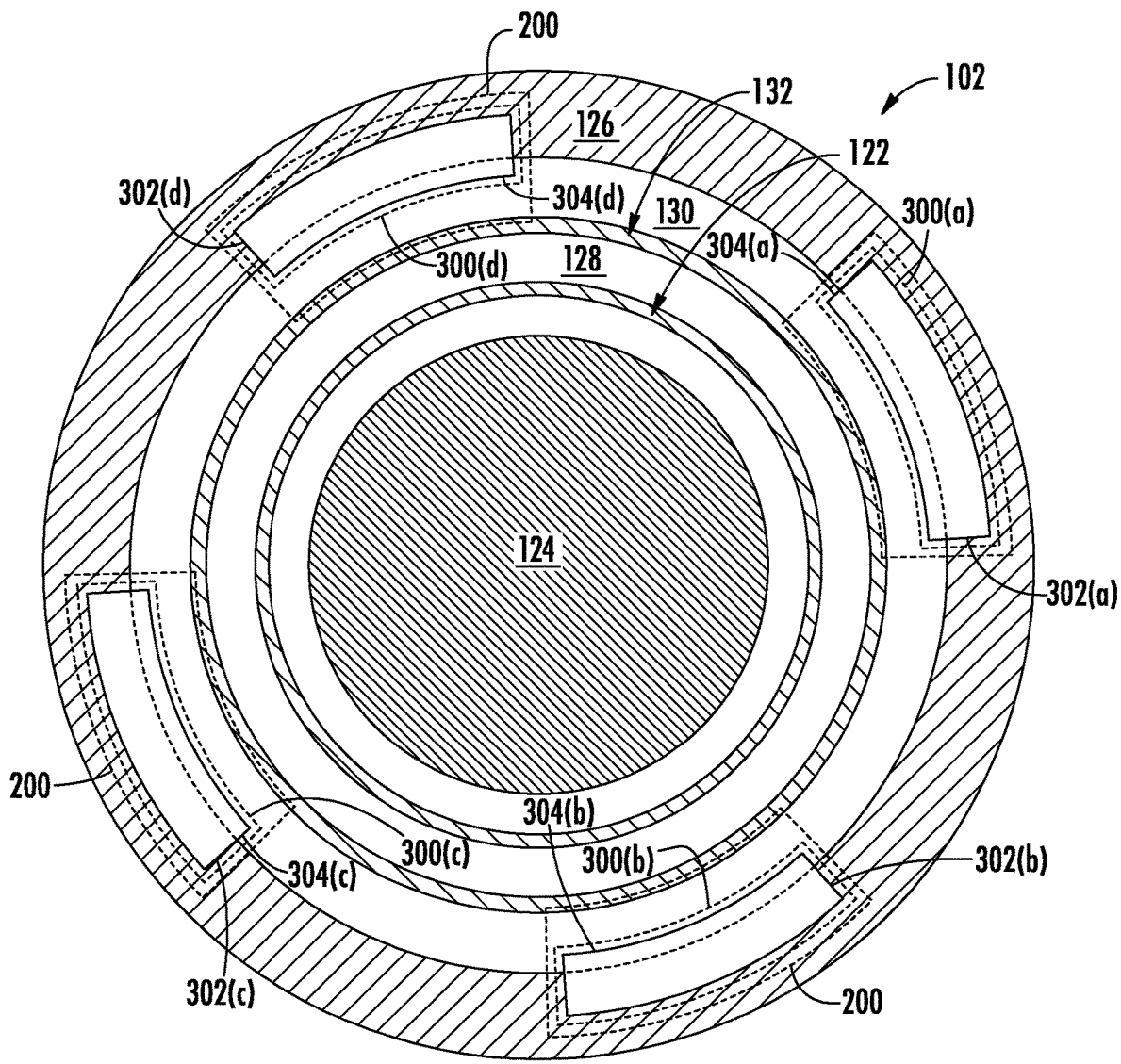
FIG. 1D schematically shows a cross-sectional view of the exemplary turbomachine of FIG. 1D.
Figure 1E:
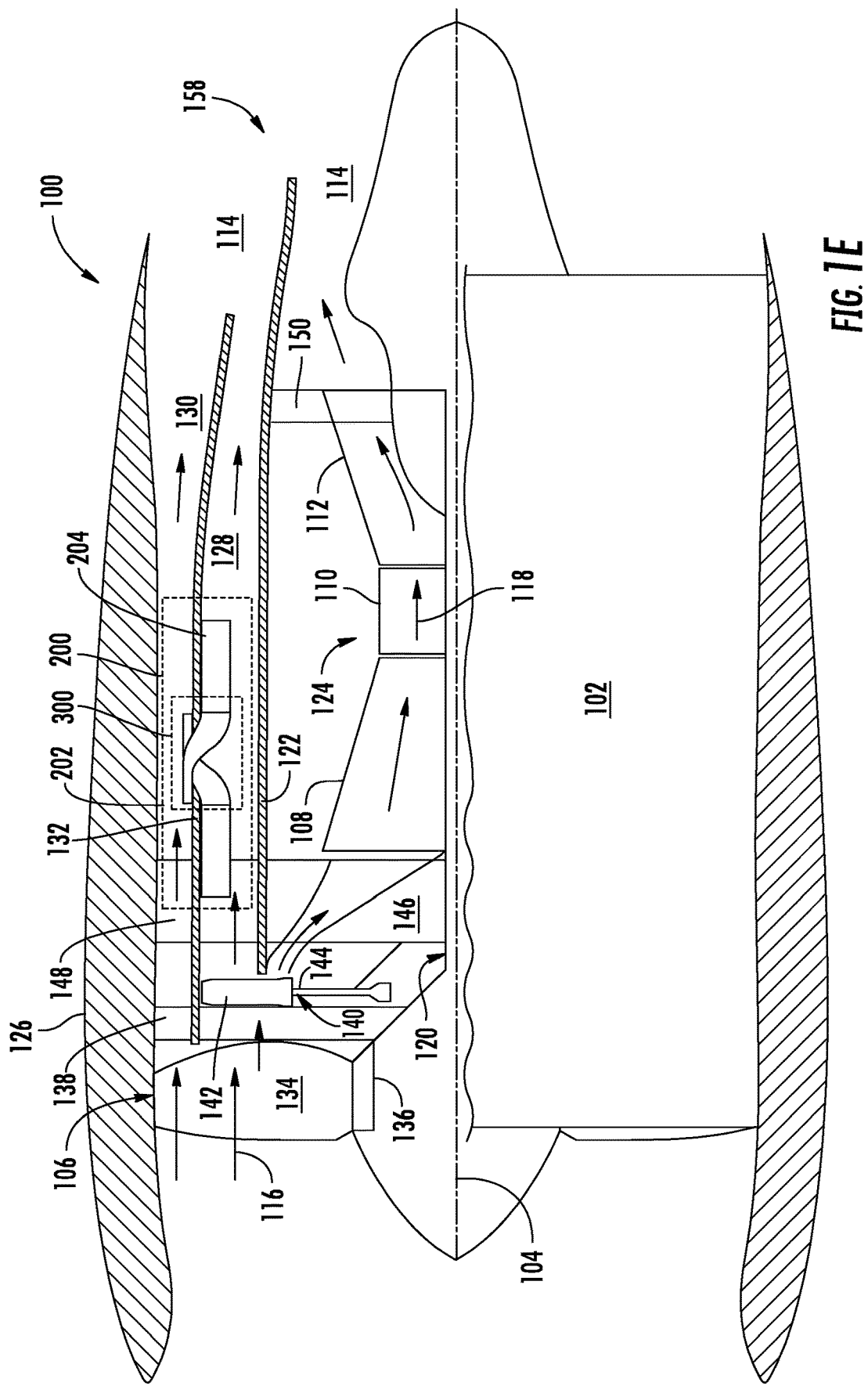
FIG. 1E schematically shows a perspective cut-away view of yet another exemplary turbomachine with a fluid exchange apparatus.
Figure 1F:
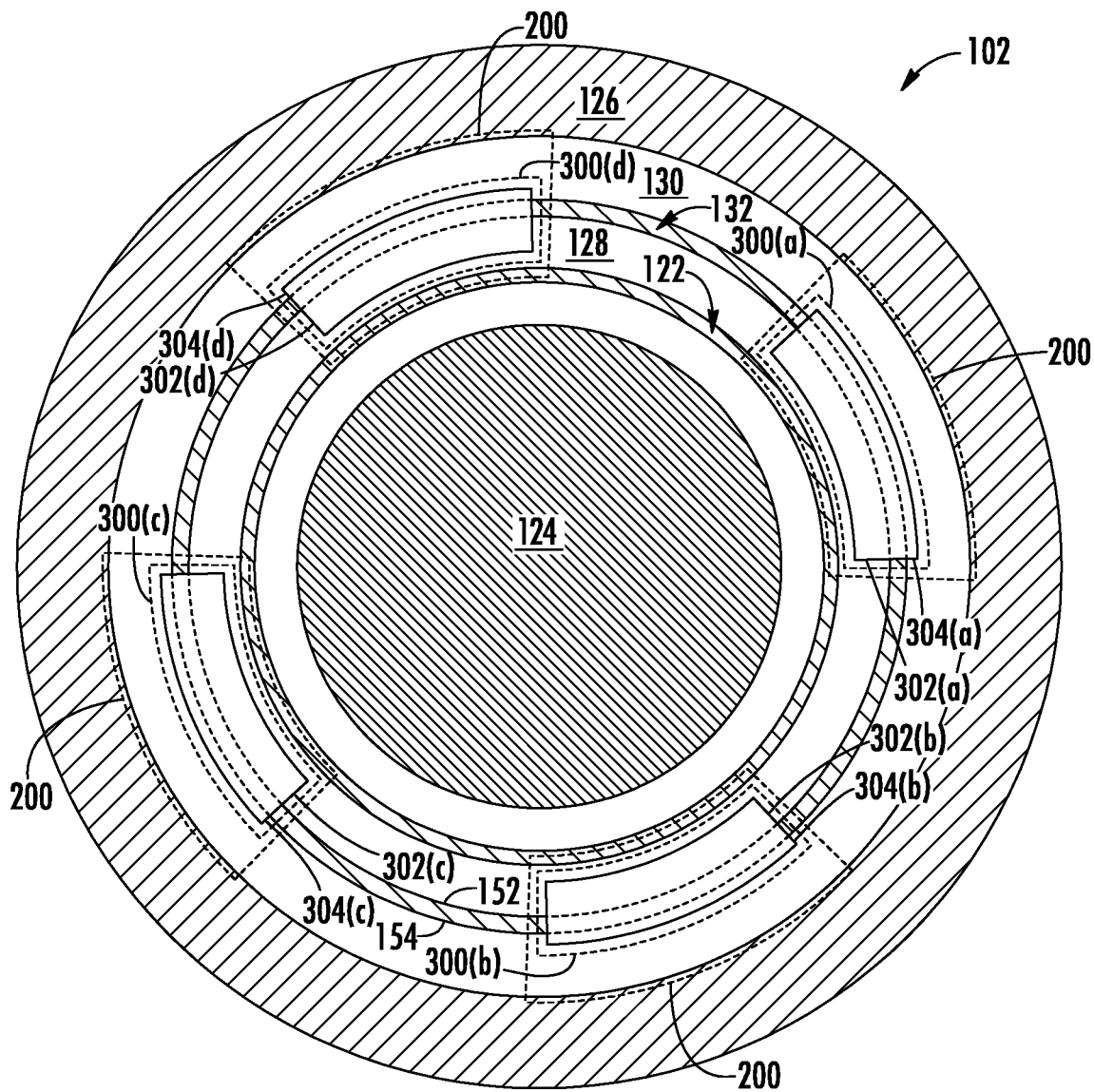
FIG. 1F schematically shows a cross-sectional view of the exemplary turbomachine of FIG. 1E.
Figure 1G:
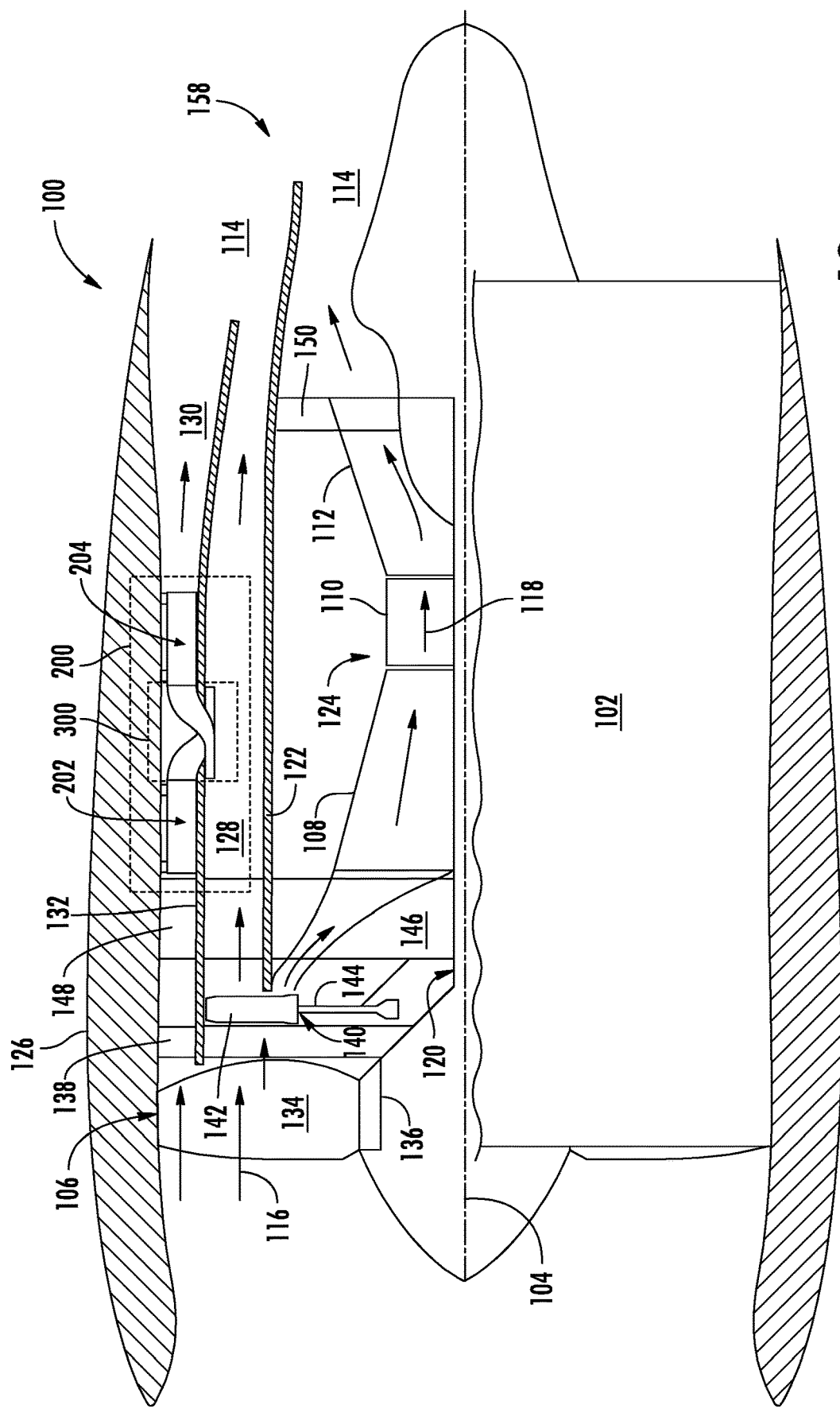
FIG. 1G schematically shows a perspective cut-away view of yet another exemplary turbomachine with a fluid exchange apparatus.

In some embodiments, such as shown in FIGS. 1C-1H, an annular third casing 132 may be located annularly between the first casing 122 and the second casing 126 and concentric therewith. Additionally, in some embodiments, such as shown in FIGS. 1E and 1G, the turbomachine 102 may include a fan module 106 that is a multi-stage fan module, as described below.

As shown in FIGS. 1C-1H, the first casing 122 and the third casings 132 define radially therebetween an annular inner or first duct 128 which coaxially surrounds the core engine 124. The first duct 128 extends axially in length from its forward inlet end behind the fan module 106, around and bypassing the core engine 124. The second casing 126 and the third casings 132 define radially therebetween an annular outer or second duct 130 which coaxially surrounds the fan module 106 and the first duct 128 in flow communication with the radially outer tip of the fan module 106. The second duct 130 extends axially in length from its inlet end directly behind the fan module 106 to its outlet end disposed axially aft of the core engine 124 and turbine section 112 at the aft end of the first duct 128. In the embodiments shown in FIGS. 1C-1H, the first duct 128 may be an inner bypass duct, and the second duct 130 may be an outer bypass duct.

The first duct 128 and the second duct 130 are concentric with each other and extend from the fan module 106 in a long duct configuration over the majority of the axial length of the turbomachine 102 to bypass the inner core engine 124 with two concentric streams of airflow. The fan module 106 includes a first fan blade assembly 134 that includes a single stage or row of large first fan rotor blades extending radially outwardly from a supporting first rotor disk 136. In exemplary embodiments, the first fan blade assembly 134 includes rotor blades that are large in diameter and extend radially outwardly across the radial span of the first duct 128 disposed directly there behind, and additionally extends radially outwardly over the radial span of the inlet end of the second duct 130 to terminate in a small radial spacing or gap just below the inner surface of the second casing 126 surrounding the fan module 106. The fan module 106 may also include a row of fixed outlet guide vanes (OGVs) 138 is disposed aft of the first fan blade assembly 134. The OGVs 138 may have suitable airfoil configurations for deswirling the pressurized ambient air 116 discharged from the radially outer tip portion of the first fan blade assembly 134. When the fan module 106 is a multi-stage fan module, the fan module 106 may include a second fan blade assembly 140. The second fan blade assembly 140, when present, may include a single stage or row of small second fan rotor blades 142 extending radially outwardly from a supporting second rotor disk 144 and is disposed axially between the first fan blade assembly 134 and the first duct 128. In exemplary embodiments, the small diameter second fan blade assembly 140, when present, may extend radially outwardly across both the inlet end of the core engine 124 leading to the compressor section 108 and the inlet end of the first duct 128 to terminate in a small clearance or gap inside the inlet end of the surrounding third casing 132. The first rotor disk 136 may be fixedly joined to the first shaft 120, and the second rotor disk 144 may be fixedly joined to the first shaft 120 or to a second shaft (not shown). In this way, the fan module 106 may include a large single stage fan blade assembly 134 directly followed in flow communication by the small single stage second fan blade assembly 140, which may be independently or commonly joined to and driven by the turbine section 112.

An annular fan frame 146 is disposed axially between the fan module 106 (or the second fan blade assembly 140, when present) and the compressor section 108, and may include a row of fan struts 148 extending radially outwardly from the central hub and through both the first and second ducts 128, 130 near the inlet ends thereof and directly aft of the OGVs 138. An annular rear frame 150 includes a corresponding row of struts which extend radially through the forward end of the exhaust section 114 for supporting the aft ends of the drive shaft(s).

In accordance with the present disclosure, a primary system 100 such as a turbomachine 102 includes a heat management system 200. An exemplary heat management system 200 includes a first heat exchanger 202, a second heat exchanger 204, and a fluid exchange apparatus 300. As shown in FIGS. 1A-1H, the heat management system 200 may be located at a variety of different positions within a turbomachine 102. In exemplary embodiments, at least a portion of the heat management system 200 may be located in the first duct 128 and/or the second duct 130. The fluid exchange apparatus 300 is configured to exchange fluid across a casing or duct wall, such from a radially inward wall 152 to a radially outward wall 154, and/or vice versa. For example, a fluid exchange apparatus 300 may exchange fluid across the first casing 122, across the second casing 126, and/or across the third casing 132. The fluid exchange apparatus 300 may exchange fluid between the first duct 128 and the second duct 130, and/or between an upstream portion and a downstream portion of a duct (e.g., the first duct 128 and/or the second duct 130).

Figure 1H:
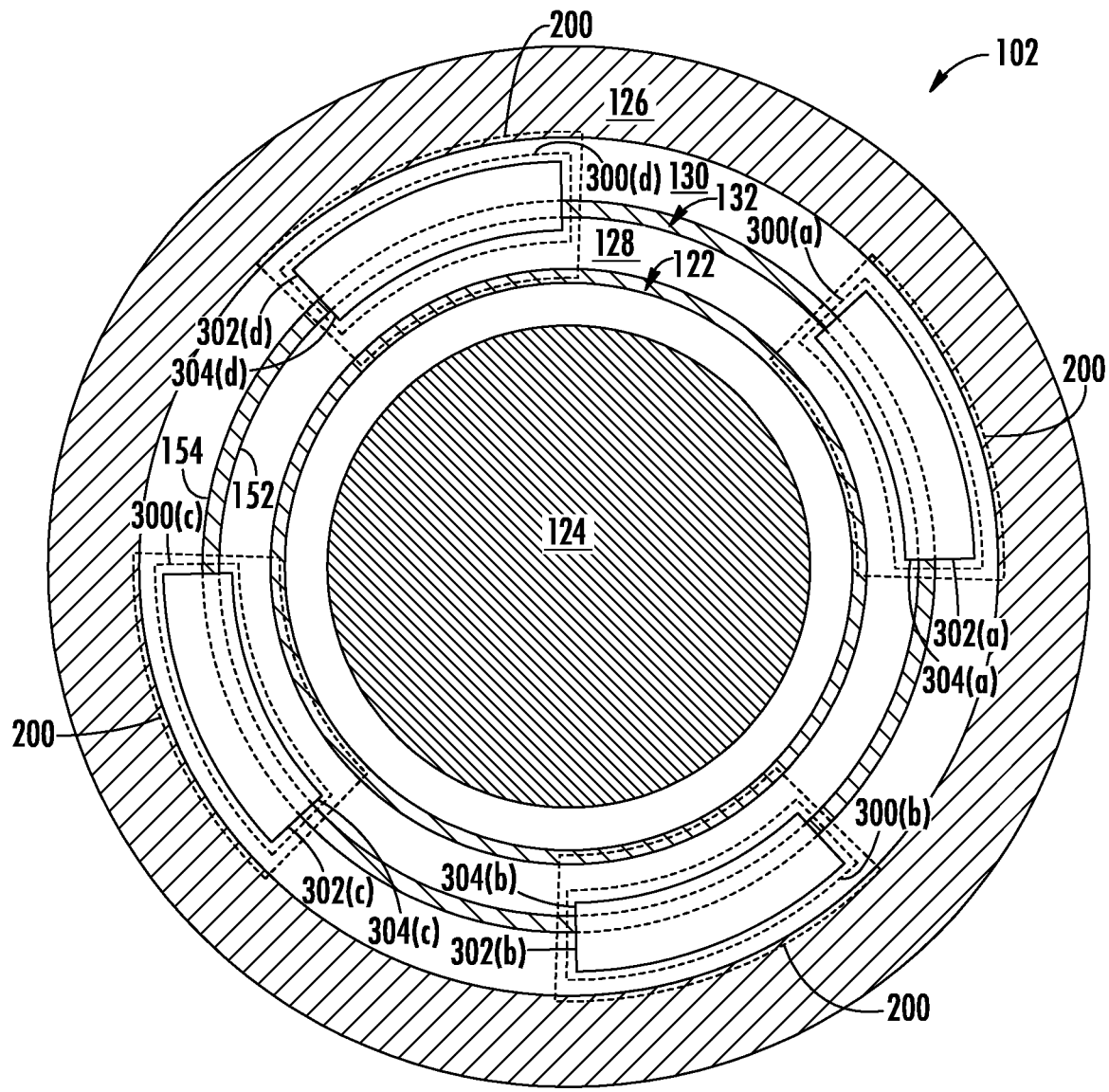
FIG. 1H schematically shows a cross-sectional view of the exemplary turbomachine of FIG. 1G.

As shown in FIGS. 1A and 1B, and in FIGS. 1E and 1F, the heat management system 200 may be situated substantially in the first duct 128 with the fluid exchange apparatus 300 providing fluid communication with the second duct 130. For example, the first heat exchanger 202 and the second heat exchanger 204 may be located within the first duct 128 with the fluid exchange apparatus 300 providing fluid communication with the second duct 130. Alternatively, as shown in FIGS. 1G and 1H, the heat management system 200 may be situated substantially in the second duct 130, such as with the first heat exchanger 202 and the second heat exchanger 204 located within the second duct 130 and the fluid exchange apparatus 300 providing fluid communication with the first duct 128.

In some embodiments, as shown in FIGS. 1A and 1C, the heat management system 200 may optionally include an inlet duct 206, which may include a scoop 208 and/or a booster fan 210 operably configured to provide or increase air flow to the first heat exchanger 202. Additionally, or in the alternative, such inlet duct 206, scoop 208 and/or booster fan 210 may be operably configured to provide air flow and/or to increase air flow to the second heat exchanger 204. The heat management system 200 may additionally or alternatively include an outlet duct 212, such as shown in FIG. 1C. In some embodiments, as shown in FIGS. 1C and 1D, the heat management system 200 may be located substantially within the body of a casing, such as the second casing 126. An inlet duct 206 and scoop 208 may be configured to provide fluid communication to the inlet of the first heat exchanger 202, such as from an upstream side of the second duct 130. The scoop 208 may direct air flow from the second duct 130 into the heat management system 200. An outlet duct 212 may be configured to provide fluid communication from the outlet of the second heat exchanger 204, such as to a downstream side of the second duct 130.

Figure 2A:
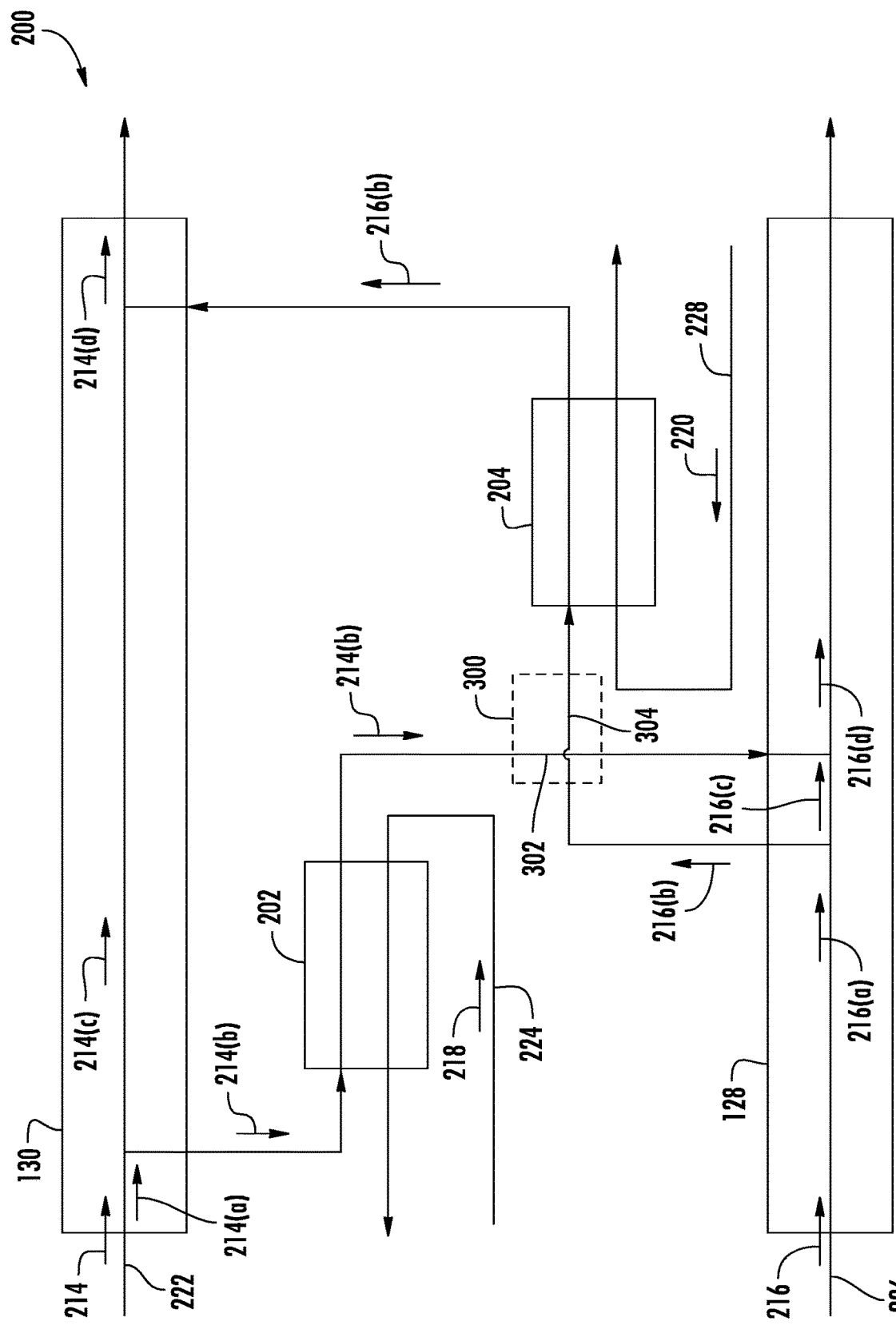
FIGS. 2A and 2B show diagrams depicting heat management systems that include a fluid exchange apparatus.
Figure 2B:
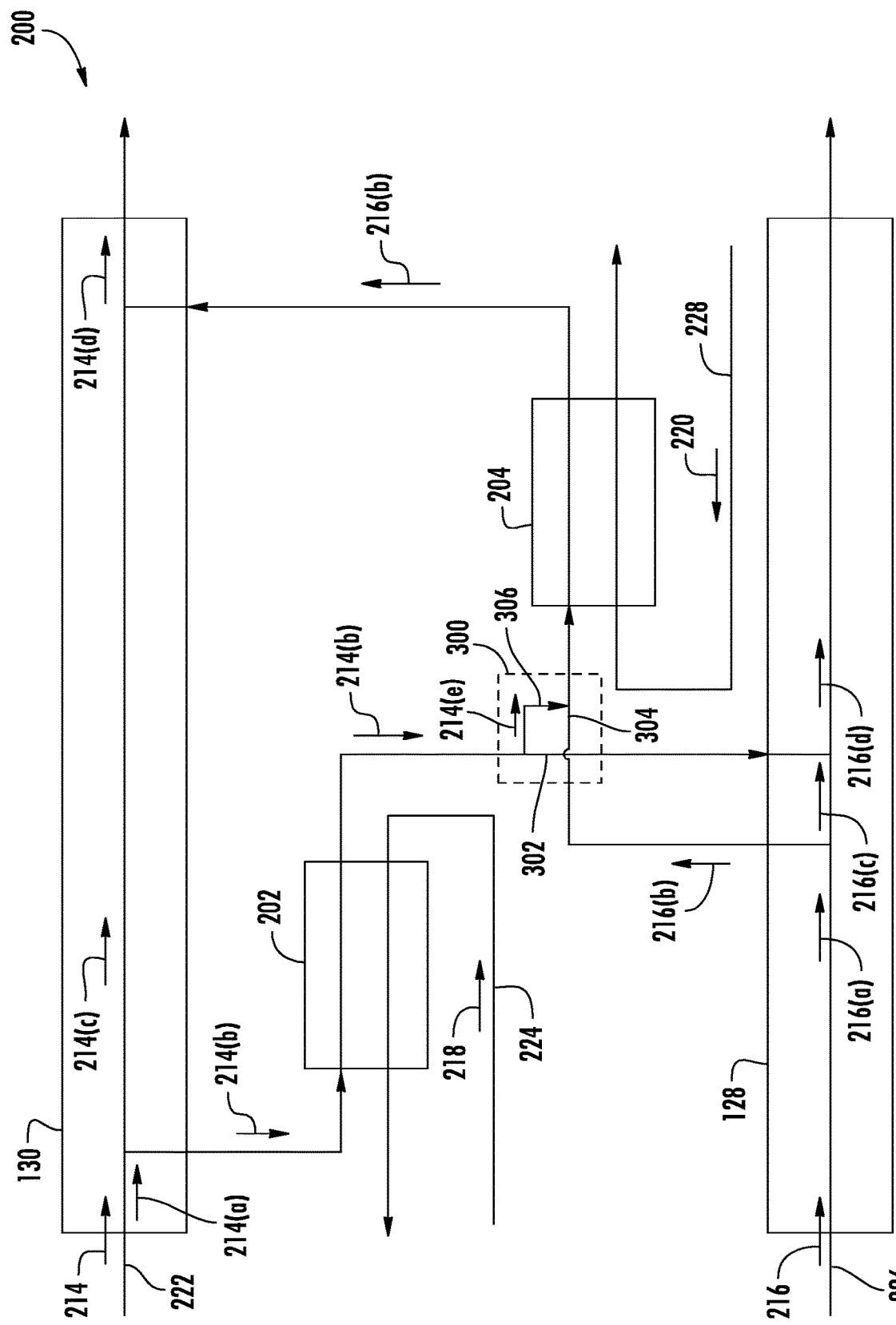

Now referring to FIGS. 2A and 2B, schematics of exemplary embodiments of a heat management system 200 are shown. As shown, the heat management system 200 may include a first heat exchanger 202 configured to receive a first fluid 214 from a second duct 130 and a second heat exchanger 204 configured to receive a second fluid 216 from a first duct 128. The first heat exchanger 202 may be configured to transfer heat between the first fluid 214 and a third fluid 218, and the second heat exchanger 204 may be configured to transfer heat between the second fluid 216 and a fourth fluid 220.

During operation, the first fluid 214 flows through a first pathway 222 defined at least in part by a second duct 130. At least a portion of the first fluid 214($a$) flowing through the second duct 130 may be split between a first portion of the first fluid 214($b$) and a second portion of the first fluid 214($c$). The first portion of the first fluid 214($b$) enters the first heat exchanger 202 via the first pathway 222 while the second portion of the first fluid 214($c$) bypasses the first heat exchanger 202 and continues to flow through the second duct 130. Meanwhile, the third fluid 218 enters the first heat exchanger 202 via a third pathway 224, allowing heat to transfer from the third fluid 218 to the first fluid 214($b$), or vice versa. In some embodiments, all of the first fluid 214 may flow across or through the first heat exchanger 202. Alternatively, in some embodiments a first portion of the first fluid 214($b$) may flow across or through the first heat exchanger 202 while a second portion of the first fluid 214($c$) continues along the first pathway 222, such as through the second duct 130.

The second fluid 216 flows through a second pathway 226 defined at least in part by a first duct 128. At least a portion of the second fluid 216($a$) flowing through the first duct 128 may be split between a first portion of the second fluid 216($b$) and a second portion of the second fluid 216($c$). The first portion of the second fluid 216($b$) enters the second heat exchanger 204 via the second pathway 226 while the second portion of the second fluid 216($c$) bypasses the second heat exchanger 204 and continues to flow through the first duct 128. Meanwhile, the fourth fluid 220 enters the second heat exchanger 204 via a fourth pathway 228, allowing heat to transfer from the fourth fluid 220 to the second fluid 216, or vice versa. In some embodiments, all of the second fluid 216 may flow across or through the second heat exchanger 204. Alternatively, in some embodiments a first portion of the second fluid 216($b$) may flow across or through the second heat exchanger 204 while a second portion of the second fluid 216($c$) continues along the second pathway 226, such as through the first duct 128.

The first portion of the first fluid 214($b$) exiting the first heat exchanger 202 and the second fluid 216($b$) passing or exiting the second heat exchanger 204 both flow through a fluid exchange apparatus 300. The fluid exchange apparatus 300 includes a first interleaved pathway 302 and a second interleaved pathway 304. The first interleaved pathway 302 includes an upstream side and a downstream side. The upstream side of the first interleaved pathway 302 may be in fluid communication with an upstream side of the first pathway 222. The downstream side of the first interleaved pathway 302 may be in fluid communication with a downstream side of the second pathway 226. The second interleaved pathway 304 also includes an upstream side and a downstream side. The upstream side of the second interleaved pathway 304 may be in fluid communication with an upstream side of the second pathway 226. The downstream side of the second interleaved pathway 304 may be in fluid communication with a downstream side of the first pathway 222. The foregoing configuration and arrangement of the fluid exchange apparatus 300 with respect to the first and second pathways 222, 226 is provided by way of example and is not to be limiting. A fluid exchange apparatus 300 may be configured and arranged in numerous ways with respect to various pathways, all of which are within the scope of the present disclosure.

The first interleaved pathway 302 may be in fluid communication with the first heat exchanger 202. For example, the first heat exchanger 202 may include a first inlet and a first outlet, with the first inlet in fluid communication with an upstream portion of the first pathway 222, and the first outlet in fluid communication with an inlet of the first interleaved pathway 302. An outlet of the first interleaved pathway 302 may be in fluid communication with a downstream portion of the first pathway 222. The first interleaved pathway 302 may receive a stream of the first fluid 214($b$) from the first heat exchanger 202 and may direct the first fluid 214($b$) to the second pathway 226, where the first fluid 214($b$) may join the second fluid 216($c$) flowing along the second pathway 226 so as to provide a combined second fluid 216($d$). In this manner, the first fluid 214($b$) may flow from the upstream portion of the first pathway 222, across or through the first heat exchanger 202, and then into and through the first interleaved pathway 302 and into the downstream portion of the second pathway 226.

The second interleaved pathway 304 may be in fluid communication with the second heat exchanger 204. For example, the second heat exchanger 204 may include a second inlet and a second outlet, with the second inlet in fluid communication with the second interleaved pathway 304 and the second outlet in fluid communication with a downstream portion of the first pathway 222. The second interleaved pathway 304 may receive a stream of the second fluid 216(b) from an upstream portion of the second pathway 226 and may direct the second fluid 216(b) to the first pathway 222, where the second fluid 216(b) may join the first fluid 214(c) flowing along the first pathway 222 so as to provide a combined first fluid 214(d). In this manner, the second fluid 216(b) may flow from the upstream portion of the second pathway 226, through the second interleaved pathway 304, across or through the second heat exchanger 204, and then into the downstream portion of the first pathway 222.

In some embodiments, as shown in FIG. 2B, the fluid exchange apparatus 300 may include a crossover pathway 306. The crossover pathway 306 may provide fluid communication between the first interleaved pathway 302 and the second interleaved pathway 304. For example, the crossover pathway 306 may be configured to allow a third portion of the first fluid 214(e) to cross over from the first interleaved pathway 302 to the second interleaved pathway 304, where the third portion of the first fluid 214(e) may join the second fluid 216(b) flowing to the second heat exchanger 204.

In some embodiments, the second duct 130 may include at least a portion of the annular outer bypass duct 130, and the first duct 128 may include at least a portion of the annular inner bypass duct 128. The first fluid 214 may include air 116 flowing through the annular outer bypass duct 130, such as a stream of outer bypass air 214. The second fluid 216 may include air 116 flowing through the annular inner bypass duct 128, such as stream of inner bypass air 216.

In an exemplary embodiment, the first heat exchanger 202 may be any thermal management heat exchanger used in connection with a turbomachine 102 or an aircraft. For example, the first heat exchanger 202 may be a compressor bleed air cooler. The first heat exchanger 202 may be configured to cool a stream of bleed air from one or more compressor stages of a turbomachine 102 flowing across or through the first heat exchanger 202. The bleed air may be cooled using a stream of outer bypass air 214(b) from the annular outer bypass duct 130. By cooling the compressor bleed air, the first heat exchanger 202 may provide a heated stream of outer bypass air 214(b). The heated stream of outer bypass air 214(b) may be directed from the first heat exchanger 202 into the annular inner bypass duct 128 using the first interleaved pathway 302 of the fluid exchange apparatus 300. In some embodiments, the thrust generated by a turbomachine 102 may be enhanced by directing the heated stream of outer bypass air 214(b) through the first interleaved pathway 302 and into the annular inner bypass duct 128.

The second heat exchanger 204 may be a cooled cooling air heat exchanger. The second heat exchanger 204 may be configured to cool a stream of turbine cooling air (e.g., high pressure turbine cooling air) flowing across or through the second heat exchanger 204 using a stream of inner bypass air 216(b) from the annular inner bypass duct 128. The stream of inner bypass air 216(b) may be directed to the second heat exchanger 204 using the second interleaved pathway 304 of the fluid exchange apparatus 300. By cooling the stream of turbine cooling air, the second heat exchanger 204 may provide a heated stream of inner bypass air 216(b). The heated stream of inner bypass air 216(b) may be directed from the second heat exchanger 204 into the annular outer bypass duct 130. In some embodiments, the thrust generated by a turbomachine 102 may be enhanced by exchanging a stream of inner bypass air 216(b) from the annular inner bypass duct 128 for a heated stream of outer bypass air 214(b) from the annular outer bypass duct 130 using the fluid exchange apparatus 300.

Now referring to FIGS. 3A and 3B, further features of exemplary heat management systems 200 will be described. As shown, a first heat exchanger 202 and a second heat exchanger 204 may be disposed within a first pathway 222, such as a second duct 130 or an annular outer bypass duct 130. Alternatively, the first heat exchanger 202 and/or the second heat exchanger 204 may be disposed within a second pathway 226, such as a first duct 128 or an annular inner bypass duct 128. The first heat exchanger 202 and the second heat exchanger 204 may be operably coupled to one or more duct walls, such as a first duct wall 230, a second duct wall 232, and/or a third duct wall 234. In some embodiments, the first heat exchanger 202 and the second heat exchanger 204 may be operably coupled to the first casing 122, the second casing 126, and/or the third casing 132 of a turbomachine 102. For example, as shown, the first heat exchanger 202 and the second heat exchanger 204 may be disposed within the first pathway 222, operably coupled to the first casing 122 and/or the second casing 126.

The heat management system 200 includes a fluid exchange apparatus 300. The fluid exchange apparatus 300 includes a first interleaved pathway 302 and a second interleaved pathway 304. The first interleaved pathway 302 of the fluid exchange apparatus 300 may direct the first fluid 214(b) from the first pathway 222 (e.g., the second duct 130 or annular outer bypass duct 130) to the second pathway 226 (e.g., the first duct 128 or annular inner bypass duct 128), where the first fluid 214(b) may join the second fluid 216(c). The first interleaved pathway 302 may be operably coupled to the first heat exchanger 202, such as at an outlet side of the first heat exchanger. The second interleaved pathway 304 of the fluid exchange apparatus 300 may direct the second fluid 216(b) from the second pathway 226 (e.g., the first duct 128 or annular inner bypass duct 128) to the first pathway 222 (e.g., the second duct 130 or annular outer bypass duct 130), where the second fluid 216(b) may join the first fluid 214(c).

In some embodiments, an outer surface of the fluid exchange apparatus 300 may define an inner surface of the first pathway 222 (e.g., the second duct 130 or annular outer bypass duct 130) and/or an inner surface of the second pathway 226 (e.g., the first duct 128 or annular inner bypass duct 128). For example, as shown, a top surface 308 of the fluid exchange apparatus 300 defines an inner surface of the first pathway 222, and a bottom surface 310 of the fluid exchange apparatus 300 defines an inner surface of the second pathway 226. Additionally, or in the alternative, in some embodiments, as shown in FIG. 3B, an outer surface of the first heat exchanger 202 and/or an outer surface of the second heat exchanger 204 may define an inner surface of the first pathway 222 (e.g., the second duct 130 or annular outer bypass duct 130) and/or an inner surface of the second pathway 226 (e.g., the first duct 128 or annular inner bypass duct 128).

Figure 3A:
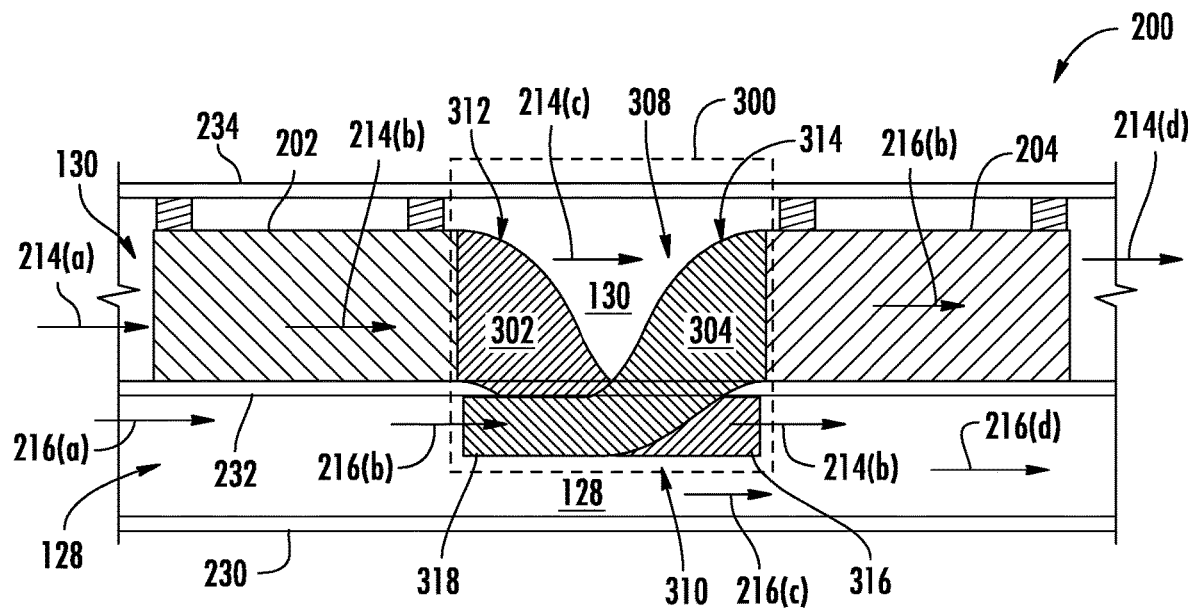
FIGS. 3A and 3B schematically show side views of exemplary heat management systems that include a fluid exchange apparatus.
Figure 3B:
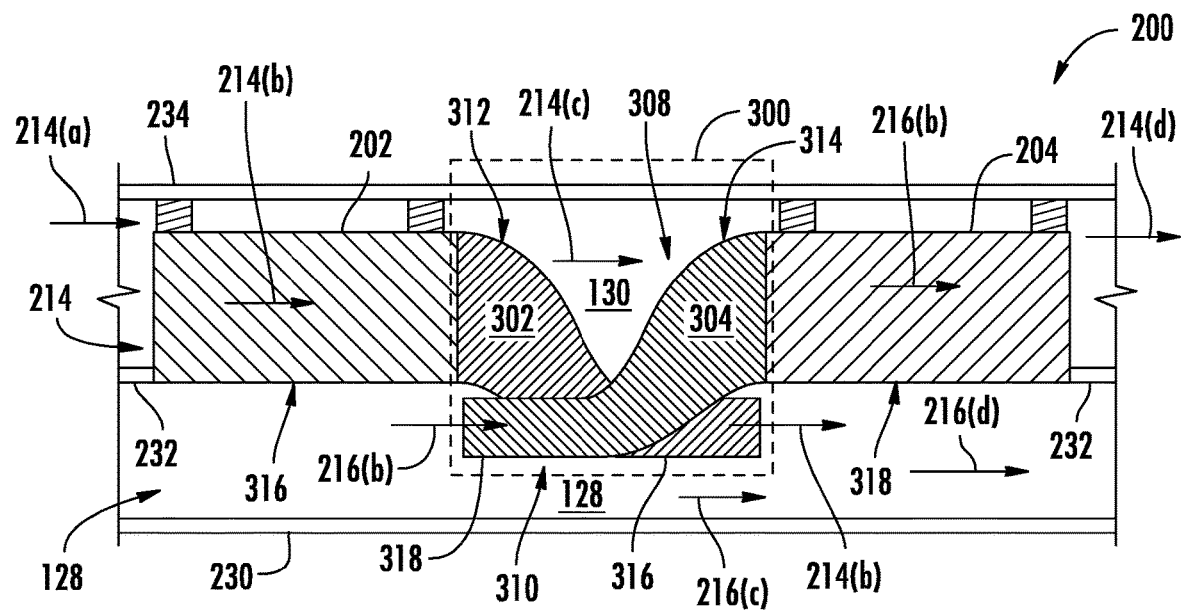

For example, as shown in FIGS. 3A and 3B, a top surface 312 of the first heat exchanger 202 and a top surface 314 of the second heat exchanger 204 may each define an inner surface of the first pathway 222. Additionally, as shown in FIG. 3B, a bottom surface 316 of the first heat exchanger 202 and a bottom surface 318 of the second heat exchanger 204 may each define an inner surface of the second pathway 226. In this manner, as shown in FIG. 3B, a portion of the annular second casing may be eliminated, instead using surfaces of the first and second heat exchangers 202, 204 and/or surfaces of the fluid exchange apparatus 300 to define at least a portion of the respective pathways. Similarly, a portion of the annular first casing 122 and/or a portion of the annular third casing 132 may be eliminated in favor of using surfaces of the first and second heat exchangers 202, 204 and/or surfaces of the fluid exchange apparatus 300 to define at least a portion of the respective pathways.

In some embodiments, as shown in FIGS. 3A and 3B, the first interleaved pathway 302 and/or the second interleaved pathway 304 may extend into the first duct 128 (e.g., the annular inner bypass duct 128), providing a decreasing cross-sectional area within the first duct 128 (e.g., the annular inner bypass duct 128) where the bottom surface 310 of the fluid exchange apparatus 300 extends into the annular inner bypass duct 128. In some embodiments, the second duct 130 (e.g., the annular outer bypass duct 130) may typically operate at a lower pressure than that of the first duct 128 (e.g., the annular inner bypass duct 128). This decreasing cross-sectional area may allow the annular inner bypass duct 128 to function as an eductor and thereby exchange fluid from the first duct 128 (e.g., the annular inner bypass duct 128) to the second duct 130 (e.g., annular outer bypass duct 130) notwithstanding a higher pressure in the first duct 128 (e.g., the annular inner bypass duct 128). For example, the decreasing cross-sectional area of first duct 128 (e.g., the annular inner bypass duct 128) may accelerate the second fluid 216 (i.e., the second portion of the second fluid 216(c)) flowing past the fluid exchange apparatus 300, allowing the second fluid 216(c) to act as an eductor fluid that accelerates and/or entrains the first fluid 214(b) flowing out of the first interleaved pathway 302 and discharging into the first duct 128 (e.g., the annular inner bypass duct 128).

Accordingly, in some embodiments a fluid exchange apparatus 300 may be configured to direct a first fluid 214 from a first pathway 222 (e.g., the second duct 130 or annular outer bypass duct 130) exhibiting a first pressure to a second pathway 226 (e.g., the first duct 128 or annular inner bypass duct 128) exhibiting a second pressure greater than the first pressure. Alternatively, in some embodiments a fluid exchange apparatus 300 may be configured to direct a second fluid 216 from a second pathway 226 (e.g., the first duct 128 or annular inner bypass duct 128) exhibiting a first pressure to a first pathway 222 (e.g., the second duct 130 or annular outer bypass duct 130) exhibiting a second pressure greater than the first pressure.

In some embodiments, a plurality of fluid exchanges apparatuses 300 may be disposed radially, such as in an array, around one or more of the respective ducts 128, 130 and/or casings 122, 132. Additionally, or in the alternative, a plurality of fluid exchange apparatuses 300 may be disposed axially, such as in a serial flow relationship, along one or more of the respective ducts 128, 130 and/or casings 122, 132. The fluid exchange apparatuses 300, and/or the first interleaved pathways 302 and/or the second interleaved pathways 304 thereof, may have varying sizes, positions, and so forth, for example, to account for circumferentially and/or axially varying temperatures, flow rates, etc. and/or to account for circumferentially and/or axially varying heat management requirements.

Figure 4A:
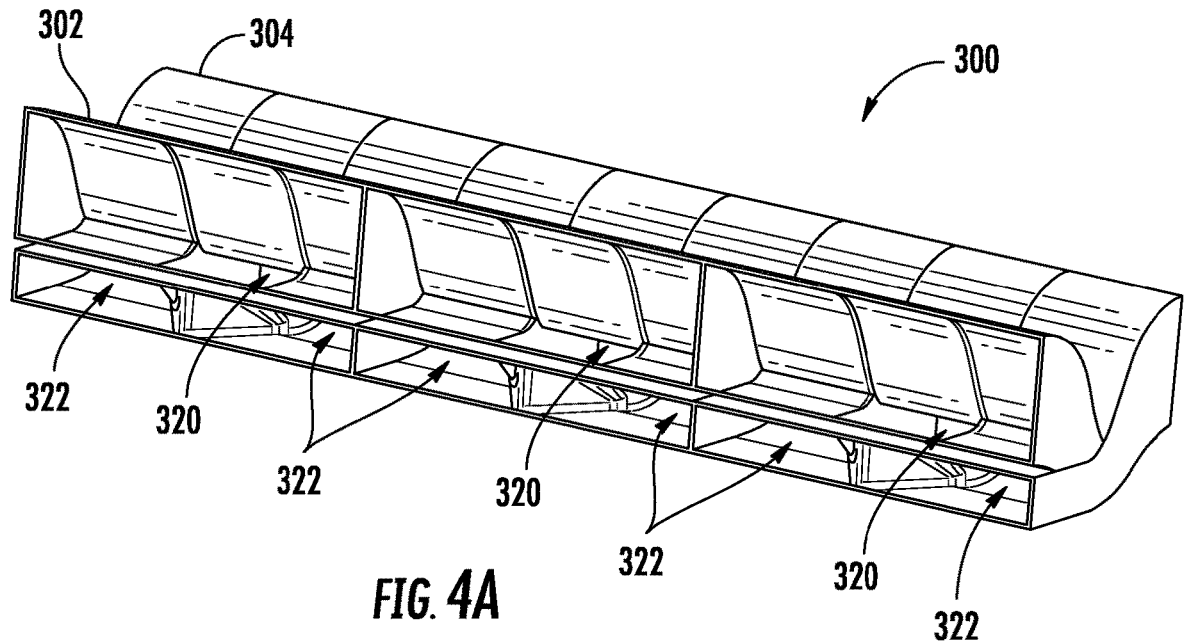
Figure 4B:
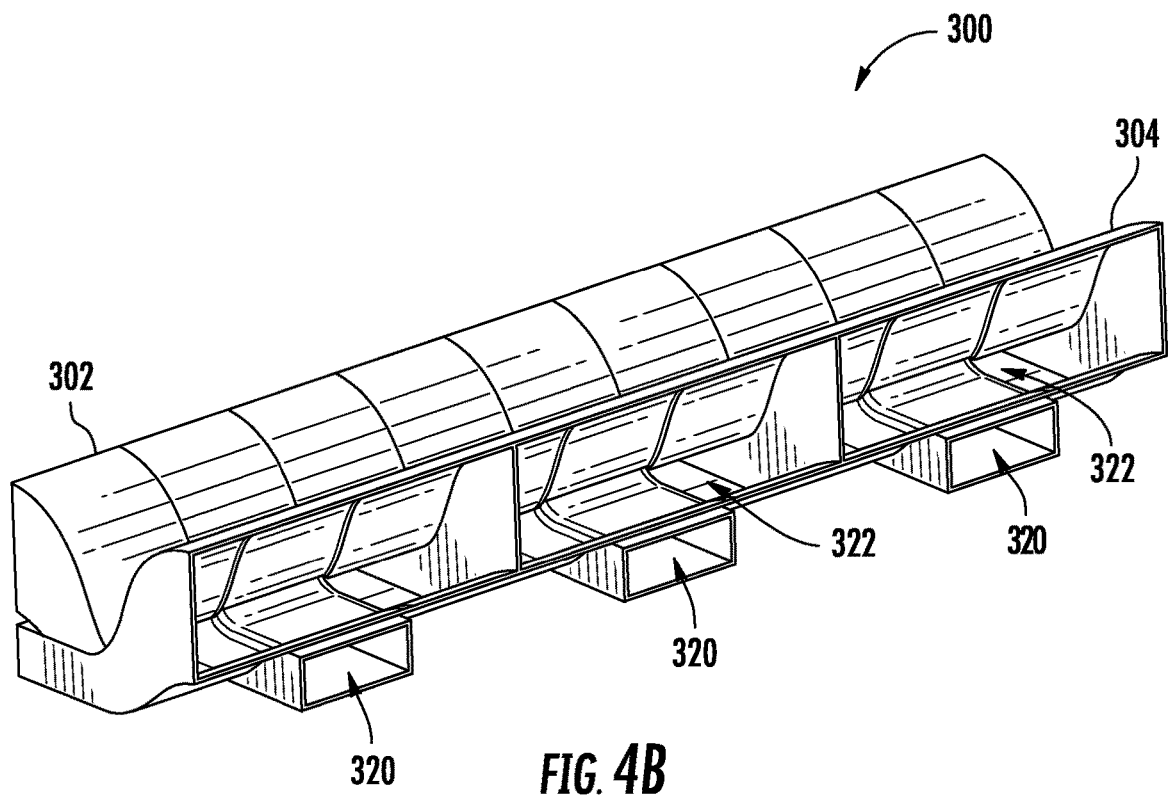

FIGS. 4A-4C show further features of an exemplary fluid exchange fluid exchange apparatus 300. While the fluid exchange fluid exchange apparatus 300 shown in FIGS. 4A-4C generally has a rectilinear shape or profile, it will be appreciated that a fluid exchange fluid exchange apparatus 300 may have any desired shape or profile. For example, as the fluid exchange fluid exchange apparatus 300 may have a curvilinear shape or profile configured to correspond with the annular ducts of a turbomachine 102 such as shown in FIGS. 1A and 1B. Additionally, numerous other shapes or profiles are contemplated, all of which are within the scope of the present disclosure.

The first interleaved pathway 302 of the fluid exchange fluid exchange apparatus 300 includes one or more passages such as a plurality of first passages 320 that traverse the second interleaved pathway 304 while maintaining fluid separation of the first fluid 214(b) within the first interleaved pathway 302 and the second fluid 216(b) within the second interleaved pathway 304. The second interleaved pathway 304 of the fluid exchange fluid exchange apparatus 300 includes one or more passages such as a plurality of second passages 322 that traverse the first interleaved pathway 302 while maintaining fluid separation of the second fluid 216(b) within the second interleaved pathway 304 and the first fluid 214(b) within the first interleaved pathway 302. As shown, a plurality of first passages 320 and a plurality of second passages 322 are interdigitated, interwoven, or intertwined with one another. A plurality of first passages 320 and a plurality of second passages 322 may be interdigitated, interwove, or intertwined with one another in any desired manner. For example, as shown, a first interleaved pathway 302 may include a plurality of first passages 320 that interdigitate, interweave, or intertwine with a plurality of second passages 322 of a second interleaved pathway 304 in an alternating manner. For example, a first passage 320 may traverse between a plurality of second passage 322, or vice versa. As shown, a first passage 320 traverses between a first one of the second passage 322 and a second one of the second passages 322, with the first and second ones of the second passage 322 converging with one another thereafter. Other interleaved configurations with interdigitated, interwove, or intertwined passages that maintain fluid separation as between respective separate pathways are contemplated, all of which are within the scope of the present disclosure.

The one or more first passages 320 of the first interleaved passageway 302 and/or the one or more second passages 322 of the second interleaved passageway 304 may include one or more curvilinear surfaces configured for enhanced aerodynamics. In some embodiments, the one or more first passages 320 and/or the one or more second passages 322 may have a cross-sectional area which decreases across the length of the passages. Such a decreasing cross-sectional area may allow the one or more passages to function as eductors which accelerate and eject fluid flowing therethrough. In this way, the fluid exchange apparatus 300 may operate to cause ejecting fluid to entrain and accelerate nearby fluid. Additionally, increased velocity of the fluid ejecting from the fluid exchange apparatus 300 may allow the fluid exchange apparatus 300 to exchange fluid from a lower pressure pathway to a higher-pressure pathway.

For example, in some embodiments the annular outer bypass duct 130 of a turbomachine 102 may typically operate at a lower pressure than that of the annular inner bypass duct 128. However, the fluid exchange apparatus 300 may utilize an increasing pressure attributed to a decreasing cross-sectional area to exchange fluid from the annular outer bypass duct 130 to the annular inner bypass duct 128 notwithstanding the higher pressure in the annular inner bypass duct 128. Accordingly, in some embodiments a fluid exchange apparatus 300 may be configured to direct a first fluid 214 from a first pathway 222 (e.g., the second duct 130 or annular outer bypass duct 130) exhibiting a first pressure to a second pathway 226 (e.g., the first duct 128 or annular inner bypass duct 128) exhibiting a second pressure greater than the first pressure. Alternatively, in some embodiments a fluid exchange apparatus 300 may be configured to direct a second fluid 216 from a second pathway 226 (e.g., the first duct 128 or annular inner bypass duct 128) exhibiting a first pressure to a first pathway 222 (e.g., the second duct 130 or annular outer bypass duct 130) exhibiting a second pressure greater than the first pressure.

In some embodiments, the second duct 130 or the first duct 128 may function as a first eductor, while one or more passages of the fluid exchange apparatus 300 may function as one or more second eductors in concert with the first eductor another. For example, the annular inner bypass duct 128 may function as a first eductor so as to accelerate and eject fluid flowing therethrough, while the one or more first passages 320 and/or the one or more second passages 322 function as one or more second eductors so as to accelerate and eject fluid flowing therethrough. As another example, the annular outer bypass duct 130 may function as a first eductor so as to accelerate and eject fluid flowing therethrough, while the one or more first passages 320 and/or the one or more second passages 322 function as one or more second eductors so as to accelerate and eject fluid flowing therethrough.

As shown in FIG. 4C, in some embodiments, the first interleaved pathway 302 and the second interleaved pathway 304 may be configured as separate, mateable components. Alternatively, a fluid exchange apparatus 300 may be formed as a single integral component that includes the first interleaved pathway 302 integrally formed with the second interleaved pathway 304.

Figure 5A:
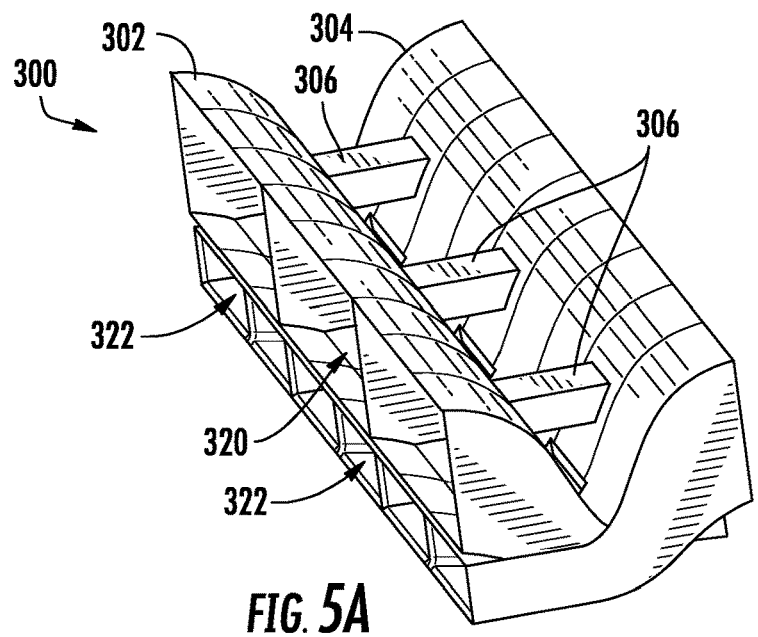
FIGS. 5A-5C schematically show perspective views of another exemplary fluid exchange apparatus.
Figure 5B:
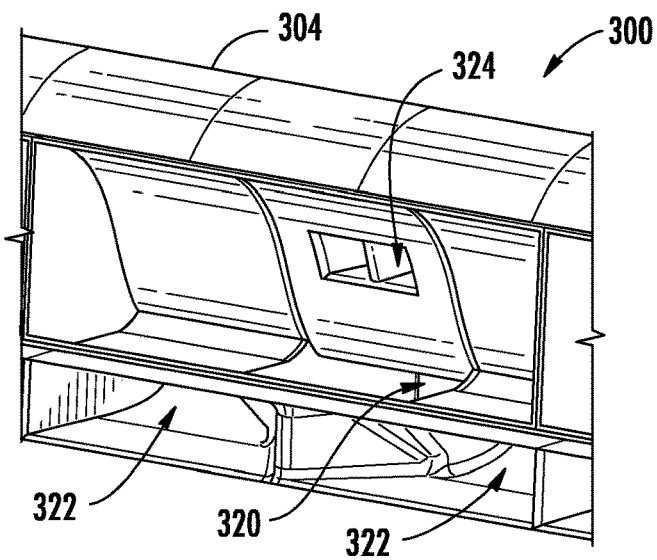
Figure 5C:
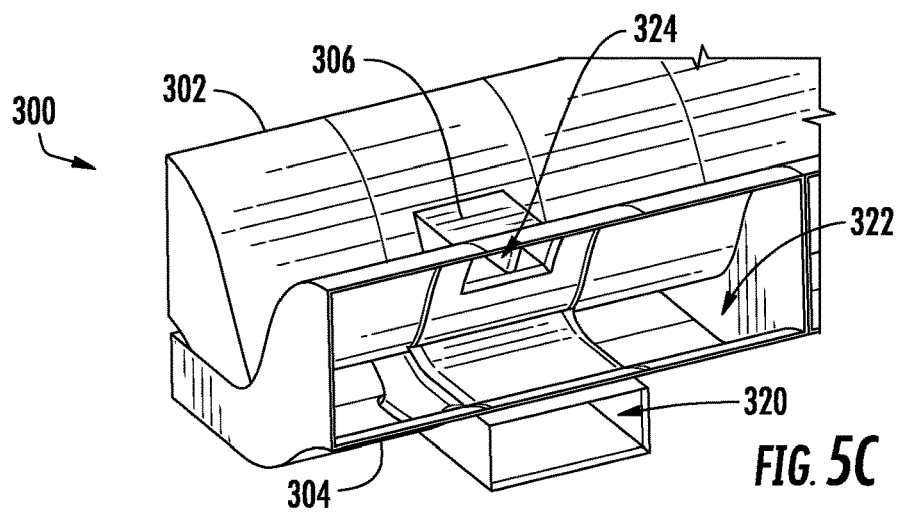

In some embodiments, as shown in FIGS. 5A-5B, a fluid exchange apparatus 300 may include one or more crossover pathways 306. The crossover pathways 306 may be configured to allow a portion of the first fluid 214(*e*) to cross over from the first interleaved pathway 302 to the second interleaved pathway 304, where the third portion of the first fluid 214(*e*) may join the second fluid 216(*b*) flowing to the second heat exchanger 204 (FIG. 2B). In some embodiments, a flow modulator 324 such as a valve, flap, damper, or the like may be located in fluid communication with at least one of such crossover pathways 306 so as to regulate fluid flow through the fluid exchange apparatus 300, such as a flow of the first fluid 214(*b*) flowing through the first pathway 222 (e.g., the second duct 130 or annular outer bypass duct 130).

Any desired technology may be used to manufacture various aspects of the fluid exchange apparatuses 300 as well as various other components described herein. Technologies that may be used to manufacture such fluid exchange apparatuses 300 or such various components include forming (e.g., rolling, stamping, joining, etc.), subtractive manufacturing (e.g., as machining, drilling, etc.), forging or casting, and additive manufacturing, as well as a combination thereof, or any other manufacturing technology. An additive manufacturing process may include any process which involves layer-by-layer construction or additive fabrication (as opposed to material removal as with conventional machining processes). Such processes may also be referred to as "rapid manufacturing processes". Additive manufacturing processes include, but are not limited to: directed energy deposition (DED) systems, such as chemical vapor deposition (CVD) systems, laser metal deposition (LIVID) systems, directed metal deposition (DMD) systems, laser engineered net shape (LENS) systems, electron beam additive melting (EBAM) systems, or rapid plasma deposition (RPD) systems; powder bed fusion (PBF) systems, such as direct metal laser melting (DMLM) systems, electron beam melting (EBM) systems, directed metal laser sintering (DMLS) systems, selective laser melting (SLM) systems, or selective laser sintering (SLS) systems; laminated object manufacturing (LOM) systems, such as ultrasonic manufacturing (UAM) systems; mater extrusion (ME) systems, such as fused deposition modeling (FDM) systems or fused filament fabrication (FFF) systems; material jetting (MJ) systems, such as smooth curvatures printing (SCP) systems, multi jet modeling (MJM) systems; and 3D printing, such as by inkjets and laserjets, including binder jetting (BJ) systems; photopolymer jetting (PJ) systems, stereolithographic (SLA) systems, and hybrid processes (HP).

Any desired materials may be used to manufacture various aspects of a fluid exchange apparatus 300 or various other components described herein. Materials that may be used to manufacture such various components include aluminum alloys, steel alloys, titanium alloys, nickel alloys (e.g., superalloys), and composites such as ceramic matrix composite (CMC) materials and/or polymer matrix composite (PMC) materials. CMC materials include a ceramic matrix material and reinforcing fibers or cloth. Exemplary ceramic matrix materials include silicon carbide (SiC) and/or carbon (C). Exemplary CMC materials include carbon-fiber-reinforced carbon (C/C), carbon-fiber-reinforced silicon carbide (C/SiC), or silicon-carbide-reinforced silicon carbide (SiC/SiC). PMC materials include a polymeric matrix material and reinforcing fibers or cloth. Exemplary PMC materials include fiber-reinforced plastics and advanced composites. Exemplary polymeric matrix materials include thermosets, such as epoxies, phenolics, polyurethanes, polyimides, bismaleimides, cyanate esters, phenolics, benzoxazines, phthalonitriles. In some embodiments, polyimides may be particularly suitable. Exemplary polyimides include phenylethynyl-terminated imide (PETI) oligomers, biphenyl dianhydride-based 2,2'-dimethylbenzidine, ultrahigh-temperature HFPE. In some embodiments, exemplary polyimides may include end caps, such as 4-phenylethynylphthalic anhydride (PEPA) and/or asymmetric oxydipththalic anhydride (a-ODPA) end caps.

Exemplary reinforcing fibers or cloth that may be utilized in CMC or PMC materials include carbon fibers, ceramic fibers, fiberglass, graphite fibers, and aramid fibers. Exemplary reinforcing fibers include monofilaments, yarns, chopped whiskers or fibers, and/or particles. In some embodiments, ceramic fibers may be formed of materials such a silicon carbide (SiC), carbon fiber (C), sapphire, alumina silicates, and/or oxides of Si, Al, Zr, Y, as well as combinations thereof. The reinforcing fibers may additionally include inorganic fillers, such as silica, quartz, pyrophyllite, wollastonite, mica, talc, kyanite, and/or montmorillonite, as well as combinations thereof. Exemplary processes for forming a component from CMC or PMC materials include chemical vapor deposition (CVD), chemical vapor infiltration (CVI), polymer impregnation and pyrolysis (PIP), melt infiltration (MI), resin transfer molding (RTM), chemical reaction, sintering, or electrophoresis.

Figure 6:
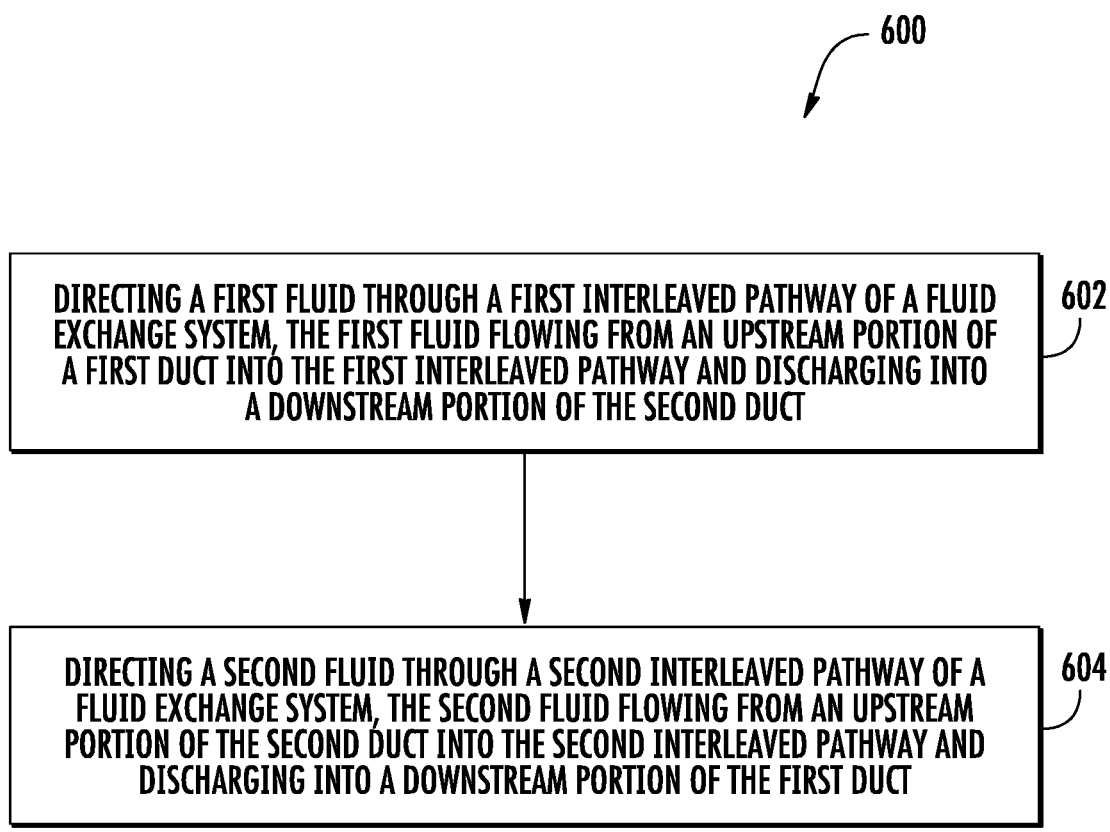
FIG. 6 shows a flow-chart depicting an exemplary method of exchanging fluids between streams.

Turning to FIG. 6, exemplary methods 600 of exchanging fluids between streams will be discussed. Exemplary methods 600 may be performed in connection with any primary system 100, including a turbomachine 102. The exemplary methods 600 are described with reference to a turbomachine 102 by way of example and not to be limiting. Numerous other primary systems 100 as well as numerous different configurations of a turbomachine 102 are contemplated, and exemplary methods 600 may be performed in connection with any such other primary system 100 or any such turbomachine 102 configuration, all of which methods 600 are within the scope of the present disclosure.

An exemplary method 600 includes, at block 602, directing a first fluid 214 through a first interleaved pathway 302 of a fluid exchange apparatus 300, and, at block 604, directing a second fluid 216 through a second interleaved pathway 304 of a fluid exchange apparatus 300. The first fluid 214 may flow from an upstream portion of a second duct 130 into the first interleaved pathway 302 and may discharge into a downstream portion of the first duct 128. The second fluid 216 may flow from an upstream portion of the first duct 128 into the second interleaved pathway 304 and may discharge into a downstream portion of the second duct 130.

An exemplary method 600 may include directing the first fluid 214 across or through a first heat exchanger 202 disposed upstream of the first interleaved pathway 302. The first heat exchanger 202 may include a first inlet in fluid communication with the first upstream portion of the second duct 130 and a first outlet in fluid communication with the first interleaved pathway 302. In this manner, a first fluid 214 may flow from the upstream portion of the second duct 130 across or through the first heat exchanger 202, and then into and through the first interleaved pathway 302 and into the downstream portion of the first duct 128.

Additionally, or in the alternative, an exemplary method 600 may include directing the second fluid 216 across or through a second heat exchanger 204 disposed downstream of the second interleaved pathway 304. The second heat exchanger 204 may include a second inlet in fluid communication with the second interleaved pathway 304 and a second outlet in fluid communication with the first downstream portion of the second duct 130. In this manner, a second fluid 216 may flow from the upstream portion of the first duct 128, into and through the second interleaved pathway 304, and then across or through the second heat exchanger 204, and into the downstream portion of the second duct 130.

In an exemplary method 600, the second duct 130 may include an annular outer bypass duct 130 of a turbomachine 102. The first duct 128 may include an annular inner bypass duct 128 of a turbomachine 102. In some embodiments, an exemplary method 600 may include cooling a stream of compressor bleed air flowing across or through the first heat exchanger 202 using a stream of outer bypass air 214(b) from the annular outer bypass duct 130, providing a heated stream of outer bypass air 214(b), and directing the heated stream of outer bypass air 214(b) into the annular inner bypass duct 128 using the first interleaved pathway 302 of the fluid exchange apparatus 300. Additionally, or in the alternative, an exemplary method 600 may include cooling a stream of turbine cooling air (e.g., high pressure turbine cooling air) flowing across or through the second heat exchanger 204 using a stream of inner bypass air 216(b) from the annular inner bypass duct 128, providing a heated stream of inner bypass air 216(b), and directing the heated stream of inner bypass air 216(b) into the annular outer bypass duct 130. The stream of inner bypass air 216(b) may be directed to the second heat exchanger 204 using the second interleaved pathway 304 of the fluid exchange apparatus 300. In some embodiments, the first heat exchanger 202 and/or the second heat exchanger 204 may be disposed within the annular outer bypass duct 130.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fluid exchange assembly for a turbomachine, comprising:
   a first interleaved pathway, the first interleaved pathway in fluid communication with an upstream portion of a first duct and a downstream portion of a second duct; and
   a second interleaved pathway, the second interleaved pathway in fluid communication with an upstream portion of the second duct and a downstream portion of the first duct;
   wherein a first portion of the fluid exchange assembly extends radially into the first duct and a second portion of the fluid exchange assembly extends radially into the second duct, and wherein a cross-sectional area of the first interleaved pathway decreases between an upstream side to a downstream side thereof.

2. The fluid exchange assembly of claim 1, wherein:
   the first interleaved pathway comprises a plurality of first passages; and
   the second interleaved pathway comprises a plurality of second passages;
   wherein the plurality of first passages and the plurality of second passages are interleaved with one another.

3. The fluid exchange assembly of claim 2, wherein the plurality of first passages traverse the second interleaved pathway so as to maintain fluid separation of a fluid in the first interleaved pathway and a fluid in the second interleaved pathway, and wherein the plurality of second passages traverse the first interleaved pathway so as to maintain fluid separation of the fluid in the second interleaved pathway and the fluid in the first interleaved pathway.

4. The fluid exchange assembly of claim 2, further comprising:
   one or more crossover pathways providing fluid communication between the first interleaved pathway and the second interleaved pathway.

5. The fluid exchange assembly of claim 4, further comprising:
   a flow modulator in fluid communication with at least one of the one or more crossover pathways.

6. The fluid exchange assembly of claim 1, wherein a cross-sectional area of the second interleaved pathway decreases from an upstream side to a downstream side thereof.

7. The fluid exchange assembly of claim 1, wherein the first interleaved pathway is configured as an eductor to eject fluid.

8. The fluid exchange assembly of claim 7, wherein the first interleaved pathway is further configured to entrain flow from the second interleaved pathway.

9. The fluid exchange assembly of claim 1, wherein the first interleaved pathway is configured to accelerate fluid therethrough.

10. The fluid exchange assembly of claim 1, wherein the second interleaved pathway is configured to decelerate fluid therethrough.

11. A turbomachine, comprising:
a first duct comprising a first upstream portion and a first downstream portion;
a second duct comprising a second upstream portion and a second downstream portion; and
a fluid exchange assembly, the fluid exchange assembly comprising: A fluid exchange assembly for a turbomachine, comprising:
a first interleaved pathway, the first interleaved pathway in fluid communication with an upstream portion of a first duct and a downstream portion of a second duct; and
a second interleaved pathway, the second interleaved pathway in fluid communication with an upstream portion of the second duct and a downstream portion of the first duct;
wherein a first portion of the fluid exchange assembly extends radially into the first duct and a second portion of the fluid exchange assembly extends radially into the second duct, and wherein a cross-sectional area of the first interleaved pathway decreases between an upstream side to a downstream side thereof.

12. The turbomachine of claim 11, wherein:
the first interleaved pathway comprises a plurality of first passages; and
the second interleaved pathway comprises a plurality of second passages;
wherein the plurality of first passages and the plurality of second passages are interleaved with one another.

13. The turbomachine of claim 12, wherein the plurality of first passages traverse the second interleaved pathway so as to maintain fluid separation of a fluid in the first interleaved pathway and a fluid in the second interleaved pathway, and wherein the plurality of second passages traverse the first interleaved pathway so as to maintain fluid separation of the fluid in the second interleaved pathway and the fluid in the first interleaved pathway.

14. The turbomachine of claim 12, wherein the fluid exchange assembly comprises:
one or more crossover pathways providing fluid communication between the first interleaved pathway and the second interleaved pathway.

15. The turbomachine of claim 14, wherein the fluid exchange assembly comprises:
a flow modulator in fluid communication with at least one of the one or more crossover pathways.

16. The turbomachine of claim 11, wherein a cross-sectional area of the second interleaved pathway decreases from an upstream side to a downstream side thereof.

17. The turbomachine of claim 11, wherein the first interleaved pathway is configured as an eductor to eject fluid.

18. The turbomachine of claim 17, wherein the first interleaved pathway is further configured to entrain flow from the second interleaved pathway.

19. The turbomachine of claim 11, wherein the first interleaved pathway is configured to accelerate fluid therethrough.

20. The turbomachine of claim 11, wherein the second interleaved pathway is configured to decelerate fluid therethrough.

* * * * *